US006843622B2

(12) United States Patent
DeMint et al.

(10) Patent No.: US 6,843,622 B2
(45) Date of Patent: Jan. 18, 2005

(54) APPARATUS AND METHOD FOR PROFILING OPTICAL DISKS

(75) Inventors: Paul Eugene DeMint, Snow Camp, NC (US); Richard Lee Clark, Burlington, NC (US)

(73) Assignee: Concept Design Electronics and Manufacturing, Inc., Burlington, NC (US)

(*) Notice: Subject to any disclaimer, the term of this patent is extended or adjusted under 35 U.S.C. 154(b) by 468 days.

(21) Appl. No.: 10/075,171

(22) Filed: Feb. 14, 2002

(65) Prior Publication Data

US 2003/0151151 A1 Aug. 14, 2003

(51) Int. Cl.[7] .............................. B23C 1/14; B23C 3/04; B23C 3/12
(52) U.S. Cl. ...................... 409/138; 409/167; 409/180; 409/159; 409/172; 82/122; 82/124; 264/1.33; 264/2.7; 264/162; 425/295; 425/810
(58) Field of Search .................. 409/138, 167, 409/165, 180, 145, 147, 149, 159, 164, 172; 82/122, 124, 125; 264/1.33, 2.7, 162, 106, 107; 425/295, 810

(56) References Cited

U.S. PATENT DOCUMENTS

| 4,235,136 A | * | 11/1980 | Strausfeld .................. 82/57 |
| 4,936,180 A | * | 6/1990 | Michael et al. ............... 82/125 |
| 5,108,789 A | * | 4/1992 | Michael et al. ............ 264/1.33 |
| 5,346,654 A | | 9/1994 | Kodaka et al. |
| 5,608,717 A | | 3/1997 | Ito et al. |
| D394,648 S | | 5/1998 | Rohde |
| 5,882,555 A | | 3/1999 | Rohde et al. |
| 5,942,165 A | * | 8/1999 | Sabatini .................... 264/1.33 |
| 6,612,789 B2 | * | 9/2003 | McKenzie .................. 409/132 |
| 6,754,165 B2 | * | 6/2004 | Burnett ...................... 369/272 |
| 2002/0136155 A1 | * | 9/2002 | Chen ......................... 369/272 |

FOREIGN PATENT DOCUMENTS

| EP | 000903734 A2 | * | 3/1999 |
| JP | 61249639 | | 5/1988 |
| JP | 62234534 | | 3/1989 |
| JP | 63036484 | | 8/1989 |
| JP | 01342686 | | 9/1991 |
| JP | 01342687 | | 9/1991 |
| JP | 03164348 | | 1/1993 |
| JP | 10177000 | | 1/2000 |

OTHER PUBLICATIONS

Royal Philips Electronics, Optical Card System Description Audio, Sep. 2000, pp. 8, 8a,12, Version 1.0, Eindhoven, The Netherlands.

* cited by examiner

*Primary Examiner*—Erica Cadugan
(74) *Attorney, Agent, or Firm*—Adams Evans, P.A.

(57) ABSTRACT

An apparatus for the automated profiling the edge of successive optical disks, and including an optical disk supply assembly for holding a supply of optical disks to be profiled, a turntable for receiving an optical disk to be profiled, and for reciprocating between an optical disk loading position and an optical disk profiling position. A clamping assembly is provided for clamping the optical disk in a stationary condition to the turntable during movement between the loading position and the profiling position. A profiling cutter profiles the edge of the optical disk into a predefined shape when the turntable is in the profiling position. A profiled optical disk accumulating assembly is provided for holding optical disks which have been profiled, and a vacuum pickup assembly is mounted for rotation on a shaft between a plurality of positions under automated control of an electronic controller for applying a lifting vacuum force to an optical disk on the optical disk supply assembly for removing an optical disk from the supply assembly, moving the optical disk to the turntable and interrupting the lifting force of the vacuum to place the optical disk on the turntable, applying a lifting vacuum force to the profiled optical disk to remove it from the turntable, and moving the optical disk to the profiled optical disk accumulating assembly for storage.

13 Claims, 25 Drawing Sheets

APPARATUS AND METHOD FOR PROFILING OPTICAL DISKS

TECHNICAL FIELD AND BACKGROUND OF THE INVENTION

This invention relates to an apparatus and method for profiling optical disks. Optical disks presently take many forms, and include plastic disks which contain digital data which may represent computer software, music, video, graphics and many other types of digital data. Such disks are presently made in several sizes and are referred to by different names, for example, CD's, compact disks, optical disks, DVD's, and include unrecorded disks which can be "burned", and disks which are capable of being recorded and then re-recorded. These disks are typically circular. The terms "CD", "optical disk" and "disk" are used in this application as exemplary of the above structures and are used interchangeably.

Optical disks are also now made and sold which have irregular shapes, and are used for many purposes including business advertising. Such disks can be formed in virtually any shape so long as they will fit into and function in a disk player. One such shape commonly made and distributed is a "business card" disk, which comprises an optical disk which has been cut down in size so that two of the opposing sides are parallel, and the other two opposing sides are convex.

The label, which is typically silk-screened or adhered to the CD, has the general size and shape of the profile to be applied to the CD. The principal requirement for such disks is that the data area exist as a continuous annular area symmetrically positioned around the center hole by which the optical disk is placed on the spindle of a disk player. Such disks are approximately the size of a business card, or somewhat larger.

Known prior art includes an "eyeball" system used by assignee whereby business card CDs were formed by using guillotine chopper blades powered by pneumatic cylinders to chop the edges off of a conventional circular CD after the CD was visually aligned on a base.

U.S. Pat. No. 5,882,655 discloses a profiling apparatus wherein the disk is profiled with reference to a mark (FIG. 3A) or with reference to a notch formed in the base and the edge of the CD to be profiled (FIGS. 4–6).

This invention relates to an automated apparatus and method of profiling CD's quickly and accurately. The profiled CD may be symmetrical or asymmetrical, and the method and apparatus disclosed in this application is capable of taking a circular CD of a given diameter and reducing it in diameter to a smaller circular CD, taking a circular CD and giving it an asymmetrical shape, taking an asymmetrical CD and giving it another asymmetrical shape, or taking an asymmetrical CD and giving it a symmetrical shape, which may be circular or some other symmetrical shape.

The apparatus specifically disclosed herein takes a circular CD and profiles the edge to produce a CD having a non-round, "business card", outer profile.

The apparatus includes a supply spindle on which is placed a stack of CDs onto which labels have been placed by any suitable process. The CDs are not in any particular orientation insofar as the label is concerned, but are generally randomly oriented. A first vacuum lifter lifts a single CD from the stack and drops the CD on a template which operates on a turntable. This occurs without regard to the orientation of the label. A separate vacuum lifter lifts the CD from the turntable and orients the label to the position where it will be properly cut and shaped by the cutter. This occurs by means of an optical sensor which detects orientation marks, for example, bar code markings, on the surface of the CD. The machine has been programmed to orient the CD to a point in space by using these orientation marks. The point in space corresponds to a particular location relative to the cutter. The oriented CD is placed back on the turntable and clamped in place on the turntable by a novel drift pin arrangement, whereupon the turntable is moved laterally into a machining area where the turntable is rotated relative to a stationary cutter head to form the CD into the desired shape. A guide pin riding along the edge of a surface on the turntable corresponding to the shape to be profiled onto the CD properly positions the CD relative to the stationary cutter as the turntable rotates. A pneumatic cylinder urges the turntable against the guide pin.

After the turntable has made a complete revolution, the CD is unclamped and moved away from the machining area. The CD is removed from the turntable by a vacuum lifter which drops the CD onto a storage spindle where profiled CDs accumulate.

The entire system is controlled by a programmed microprocessor in a conventional manner.

The vacuum lifters are mounted at a ninety-degree angle to each other and move to a neutral location during the machining of the desired profile onto the CD. As an alternative, the steps of lifting the CD from the supply spindle and rotating the CD to orient it for cutting are combined into a single step by placing the optical sensor on the arm which lifts the CD from the supply spindle, so the CD is rotated into the correct orientation during the movement from the supply spindle to the turntable. This compound motion thus accomplishes two steps in one motion.

SUMMARY OF THE INVENTION

Therefore, it is an object of the invention to provide an optical disk profiler which cuts the periphery of an optical disk to a predetermined shape.

It is another object of the invention to provide an optical disk profiler which cuts the periphery of an optical disk to a predetermined shape automatically without manual interference.

It is another object of the invention to provide an optical disk profiler which cuts the periphery of multiple optical disks to a predetermined shape automatically without manual interference.

It is another object of the invention to provide an optical disk profiler which cuts the periphery of multiple optical disks to a predetermined asymmetrical shape automatically without manual interference.

It is another object of the invention to provide an optical disk profiler which cuts the periphery of multiple optical disks to a predetermined asymmetrical shape automatically, including orientation of a label on the CD to the cutter so that the label appears as desired on the profiled CD.

These and other objects of the present invention are achieved in the preferred embodiments disclosed below by providing an apparatus for the automated profiling the edge of successive optical disks, and comprising an optical disk supply assembly for holding a supply of optical disks to be profiled, a turntable for receiving an optical disk to be profiled, and for reciprocating between an optical disk loading position and an optical disk profiling position, a clamping assembly for clamping the optical disk in a stationary condition to the turntable during movement between the loading position and the profiling position, a profiling cutter for profiling the edge of the optical disk when the turntable is in the profiling position, a profiled optical disk accumulating assembly for holding optical disks which have been profiled, and a vacuum pickup assembly mounted for rotation on a shaft between a plurality of positions under automated control of an electronic controller for applying a lifting vacuum force to an optical disk on the optical disk supply assembly for removing an optical disk from the supply assembly, moving the optical disk to the turntable and interrupting the lifting force of the vacuum to place the optical disk on the turntable, applying a lifting vacuum force to the profiled optical disk to remove it from the turntable, and moving the optical disk to the profiled optical disk accumulating assembly for storage.

According to one preferred embodiment of the invention, the shaft of the vacuum pickup assembly is adapted for rotating the optical disk whereby the optical disk is oriented into a predetermined position relative to the profiling cutter preparatory to being placed on the turntable.

According to another preferred embodiment of the invention, the invention includes a second vacuum pickup assembly for rotating the optical disk whereby the optical disk is oriented into a predetermined position relative to the profiling cutter preparatory to being profiled.

According to yet another preferred embodiment of the invention, the pickup assembly comprises a vacuum lifter for applying a vacuum lifting force to the optical disk.

According to yet another preferred embodiment of the invention, the second pickup assembly comprises a vacuum lifter for applying a vacuum lifting force for holding the optical disk while it is rotated.

According to yet another preferred embodiment of the invention, the pickup assembly comprises first and second arms carrying respective first and vacuum pickup heads, the first arm adapted for moving the optical disk from the optical disk supply assembly to the turntable, and the second arm is adapted to move the optical disk to the profiled optical disk accumulating assembly for storage, and the first and second vacuum pickup heads for applying a lifting vacuum force to an optical disk to be lifted.

According to yet another preferred embodiment of the invention, the first and second arms are mounted on a common shaft for unison movement relative to each other.

According to yet another preferred embodiment of the invention, the first and second arms diverge from the common shaft at a 90 degree angle.

According to yet another preferred embodiment of the invention, the clamping assembly for clamping the optical disk in a stationary condition to the turntable during movement between the loading position and the profiling position comprises a clamp for being positioned over the optical disk. A spindle is carried by the clamp and extending through a hole in the center of the optical disk into the turntable. The spindle has a drift opening therein. A drift pin is moved into the drift opening for applying a clamping pressure on the optical disk and for being moved out of the drift opening for releasing clamping pressure on the optical disk.

According to yet another preferred embodiment of the invention, the drift pin includes a tapered surface for riding against a contact surface carried by the spindle and applying a progressive clamping pressure to the optical disk proportional to the degree of taper and the extent of movement of the drift pin relative to the spindle.

According to yet another preferred embodiment of the invention, the invention includes a clamp arm for carrying a clamp from a position radially displaced from the optical disk to a position concentric therewith, for inserting the clamp into a hole in the turntable concentric with a center hole in the compact disk, and for detaching from the clamp and leaving the clamp in position on the optical disk.

According to yet another preferred embodiment of the invention, the clamping assembly includes a spindle carried by the clamp and extending through a hole in the center of the optical disk into the turntable. The spindle includes a drift opening therein. A drift pin is provided for being moved into the drift opening for applying a clamping pressure on the optical disk and for being moved out of the drift opening for releasing clamping pressure on the optical disk.

According to yet another preferred embodiment of the invention, the drift pin includes a tapered surface for riding against a contact surface carried by the spindle and applying a progressive clamping pressure to the optical disk proportional to the degree of taper and the extent of movement of the drift pin relative to the spindle.

A method according of profiling the edge of successive optical disks to form the optical disk into a predetermined shape the method according to the invention comprises the steps of retrieving an optical disk from an optical disk supply assembly, delivering the optical disk to a turntable, and orienting the optical disk with reference to a point in space predetermined to position the optical disk for being profiled with reference to a pre-printed label on the optical disk. The optical disk is clamped in a stationary condition to the turntable. The edge of the optical disk is profiled, and the optical disks which have been profiled are accumulated in an optical disk accumulating assembly.

According to yet another preferred embodiment of the invention, the method includes the step of providing a pickup assembly mounted for rotation on a shaft between a plurality of positions under automated control of an electronic controller, and applying a lifting force to an optical disk on the optical disk supply assembly for removing an optical disk from the supply assembly. The optical disk is moved to the turntable and interrupting the lifting force to place the optical disk on the turntable. A lifting force is applied to the profiled optical disk to remove it from the turntable, the optical disk is moved to the profiled optical disk accumulating assembly for storage.

According to yet another preferred embodiment of the invention, the step of orienting the optical disk comprises the steps of placing the optical disk on a turntable, and rotating the turntable with reference to label indicia on the optical disk to place the optical disk in a position whereby the profiling occurs in registration with the shape and orientation of a label thereon.

According to yet another preferred embodiment of the invention, the step of orienting the optical disk comprises the step of rotating the optical disk whereby the optical disk is oriented into a predetermined position in space relative to the profiling cutter preparatory to being placed on the turntable.

According to yet another preferred embodiment of the invention, the step of orienting the optical disk comprises the steps of placing the optical disk on the turntable in a random position relative to a label thereon, lifting the optical disk from the turntable, rotating the optical disk whereby the optical disk is oriented into a predetermined position in space relative to the profiling cutter preparatory to being profiled, and replacing the optical disk onto the turntable.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

General Description of Operation

Figure 1:
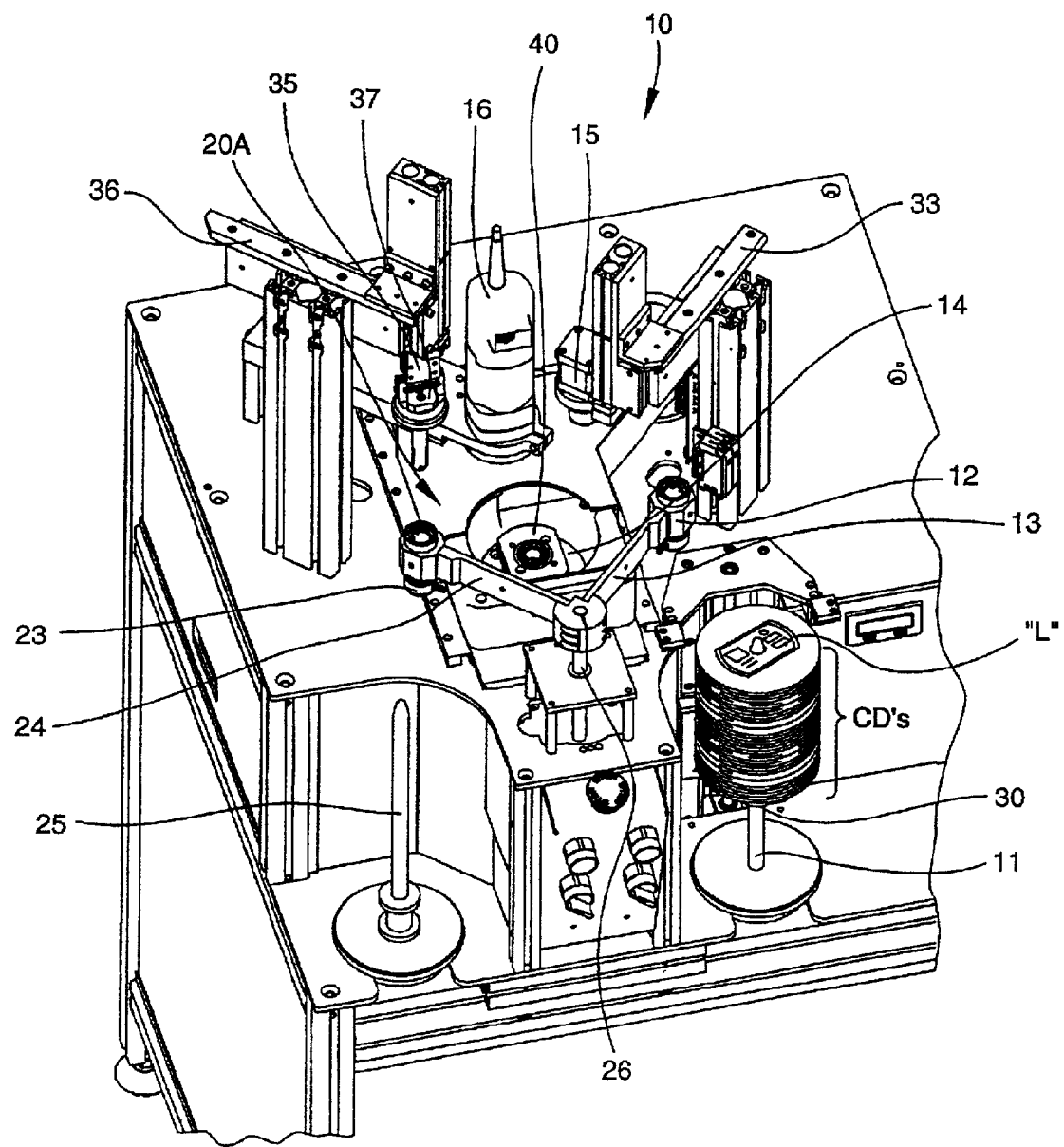
FIG. 1 is a perspective view of the profiler in a default "ready" position.

Referring now specifically to the drawings, a CD profiling apparatus according to the present invention is illustrated in FIG. 1 and shown generally at reference numeral 10.

The profiling apparatus 10 includes a supply spindle 11 on which is placed a stack of circular CDs onto which a label "L" has been placed. The CDs are not in any particular orientation insofar as the label is concerned, but are generally randomly oriented. A first vacuum lifter 12 mounted on a transfer arm 13 lifts a single CD from the stack and drops the CD onto a template 40 carried on a turntable 14. This occurs without regard to the orientation of the label. A separate vacuum lifter 15 lifts the CD from the turntable and orients the label to the position where it will be properly cut and shaped by a cutter 16. This occurs by means of an optical sensor 17 which detects orientation marks, for example, bar code markings, on the surface of the CD. The machine is programmed to orient the CD to a point in space by using these orientation marks. The oriented CD is placed back on the template 40 and clamped in place by a clamp post and drift pin arrangement, broadly indicated at 20A and 20B and shown in FIGS. 1A, 12A and 15A. The turntable 14 and template 40 carried thereon is moved laterally into a machining area where the turntable 14 is rotated relative to a stationary cutter head mounted on the cutter 16 to form the CD into the desired shape. A guide pin riding along the edge of a surface on the template 40 corresponding to the shape to be profiled onto the CD properly positions the CD relative to the stationary cutter 16 as the turntable 14 rotates. A pneumatic cylinder urges the turntable against the guide pin.

After the turntable 14 has made a complete revolution, the CD is unclamped and the clamp is moved away from the machining area. The CD is removed from the template 40 by a vacuum lifter 23 mounted on a transfer arm 24 which drops the CD onto a storage spindle 25 where profiled CDs accumulate. Both arms 13 and 24 are mounted on a single shaft 26 operated by a microprocessor-controlled motor (not shown).

The vacuum lifters 12 and 23 are mounted at a ninety-degree angle to each other and move to a neutral location, shown in FIGS. 7–16, during the machining of the desired profile onto the CD. As an alternative, the steps of lifting the CD from the supply spindle 11 and rotating the CD to orient it for cutting are combined into a single step by placing an optical sensor on the arm 13 which lifts the CD from the supply spindle 11, so the CD is rotated into the correct orientation during the movement from the supply spindle 11 to the turntable 14. This compound motion thus accomplishes two steps in one motion.

DETAILED DESCRIPTION OF OPERATION

Referring again to FIG. 1, the profiling apparatus is shown in the default ready position with both arms 13 and 24 in the neutral position. The sequence shown in the drawings is of the first CD profiling operation of a particular profiling run, so that there is no profiled CD to be moved to the storage spindle 25.

Figure 2:
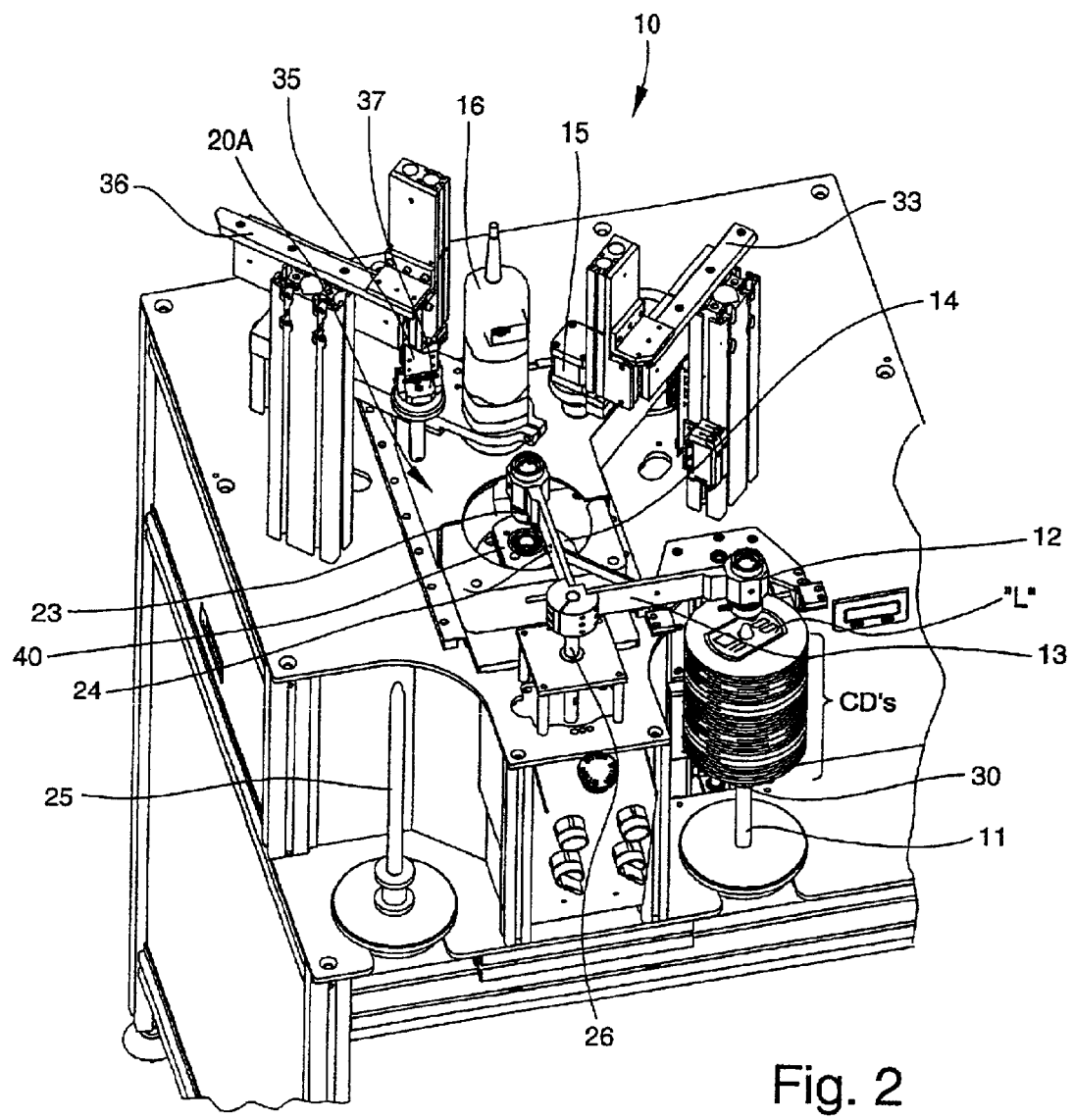
FIG. 2 is a perspective view of the profiler transfer arm moving to a position over a supply stack of CDs on a supply spindle to be profiled.

Upon command the transfer arms 13 and 24 move clockwise whereby the vacuum lifter 12 is positioned over the stack of supply CD's on the supply spindle 11, as is shown in FIG. 2. The stack of supply CD's will typically have a label "L" already printed thereon based on the shape of the CD after profiling has been completed, for example, a "business card" CD shape.

Figure 3:
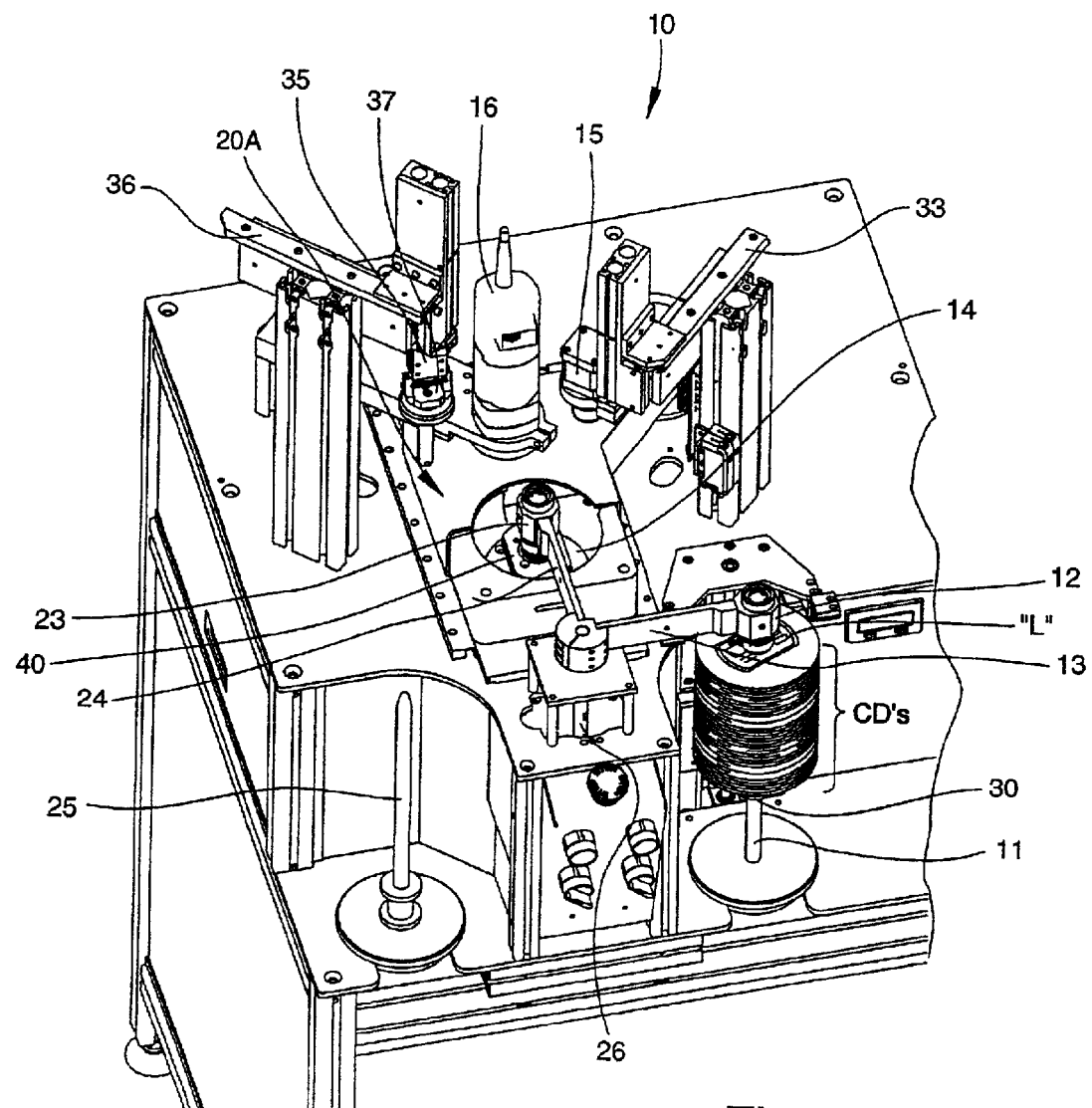
FIG. 3 is a perspective view of the profiler transfer arm moving down to pick up a CD off of the top of the supply stack of CDs.

As shown in FIG. 3, the transfer arm 12 moves down to pick up a single CD. Note that the stack of supply CD's is maintained at a constant level in relation to the transfer arm 12 by an indexer which raises a base 30 on which the stack of CD's rests as the CD's are removed one-by-one by the vacuum arm 12.

Figure 4:
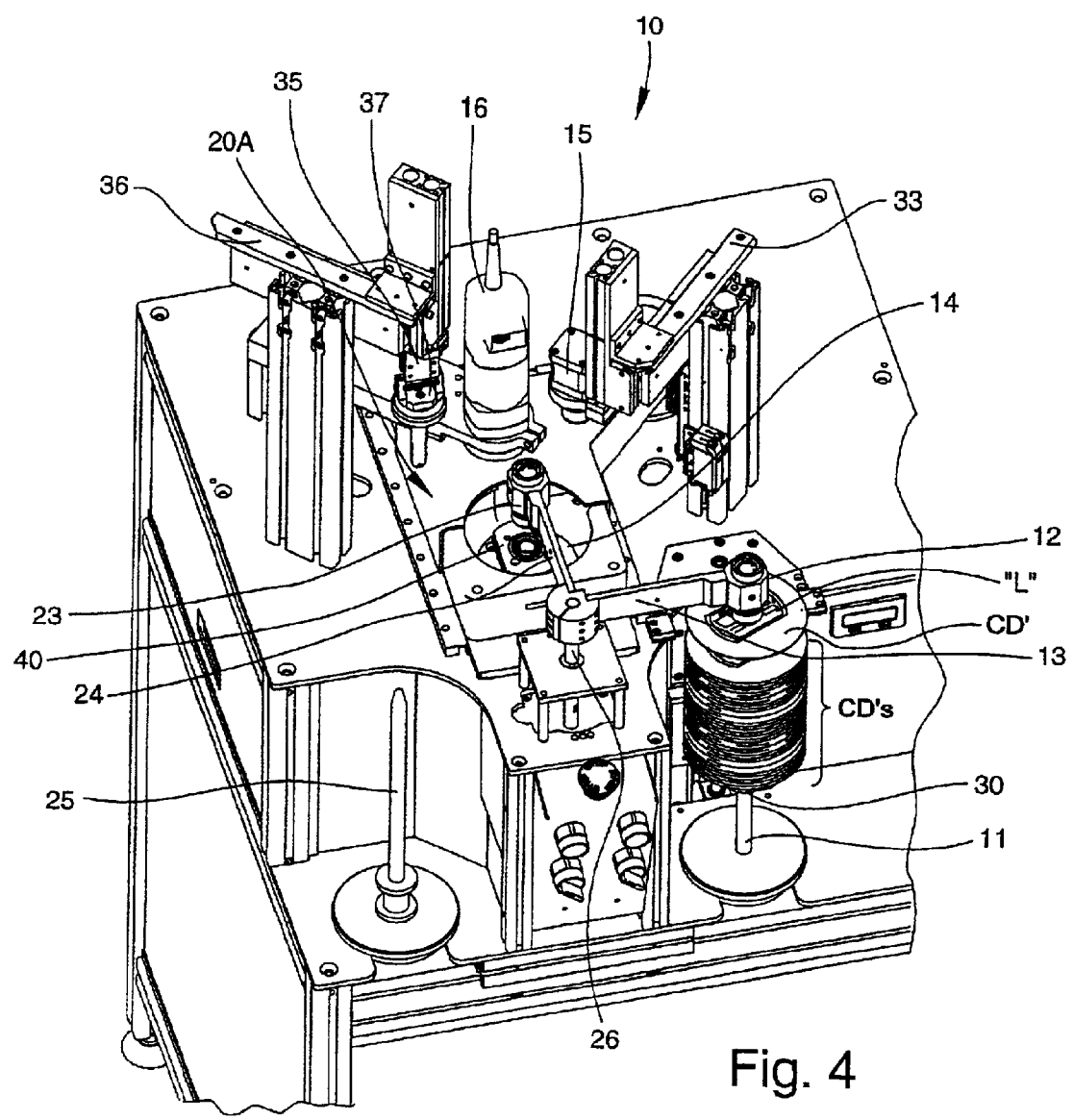
FIG. 4 is a perspective view of the profiler transfer arm picking up a CD off of the top of the stack of CDs.
Figure 5:
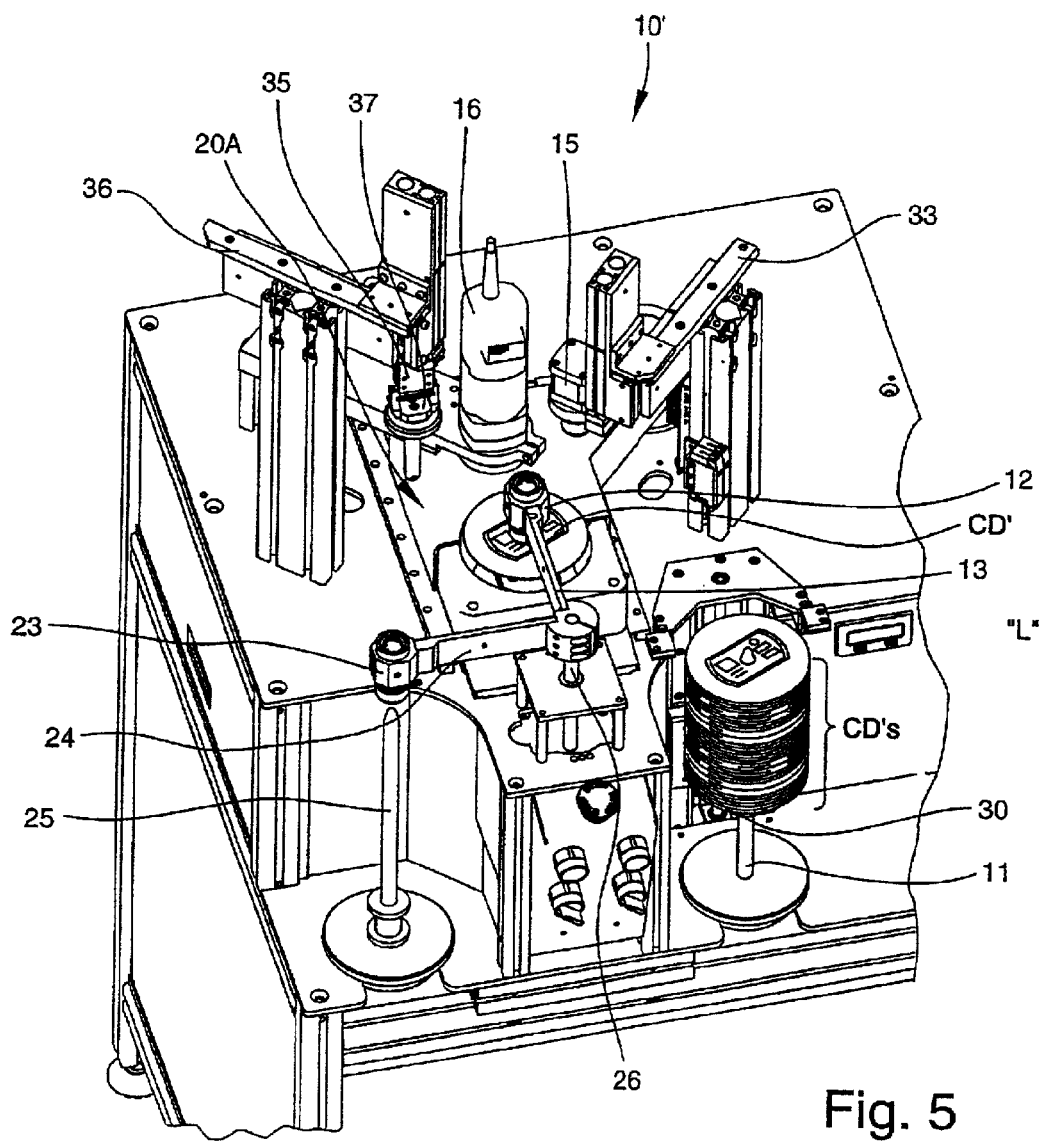
FIG. 5 is a perspective view of the profiler transfer arm moving the CD to the turntable.

As is shown in FIG. 4, the vacuum lifter 12 has lifted a single CD, "CD'", off of the supply stack of CDs. In FIG. 5, the transfer arm 13 has rotated counterclockwise into position over a template 40 carried by the turntable 14.

Figure 6:
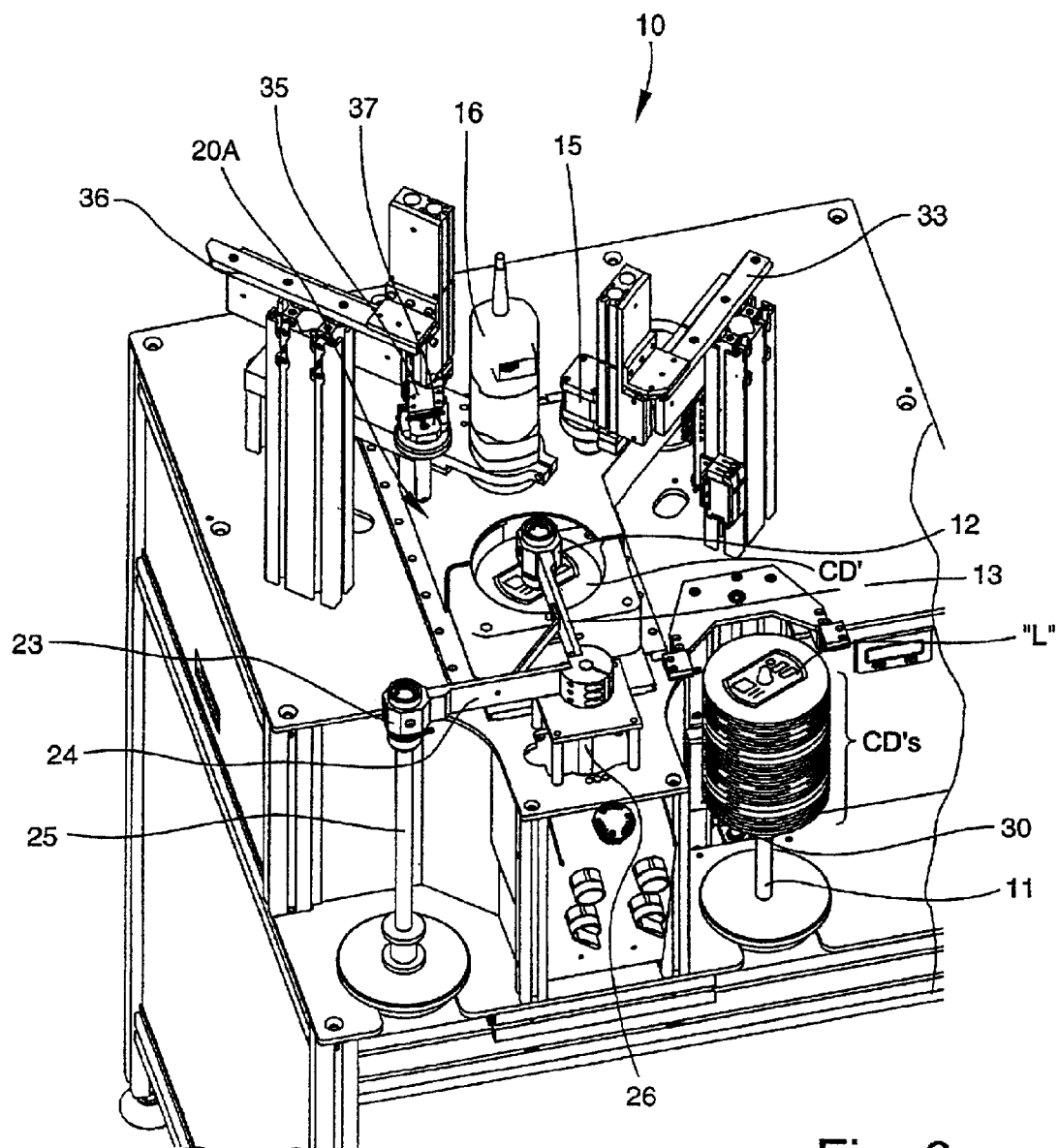
FIG. 6 is a perspective view of the profiler transfer arm placing the CD on the turntable.

In FIG. 6 the shaft 26 is lowered, causing the transfer arm 13 to lower the CD' onto the template 40. Note the position of the empty vacuum lifter 23 over the storage spindle 25.

Figure 7:
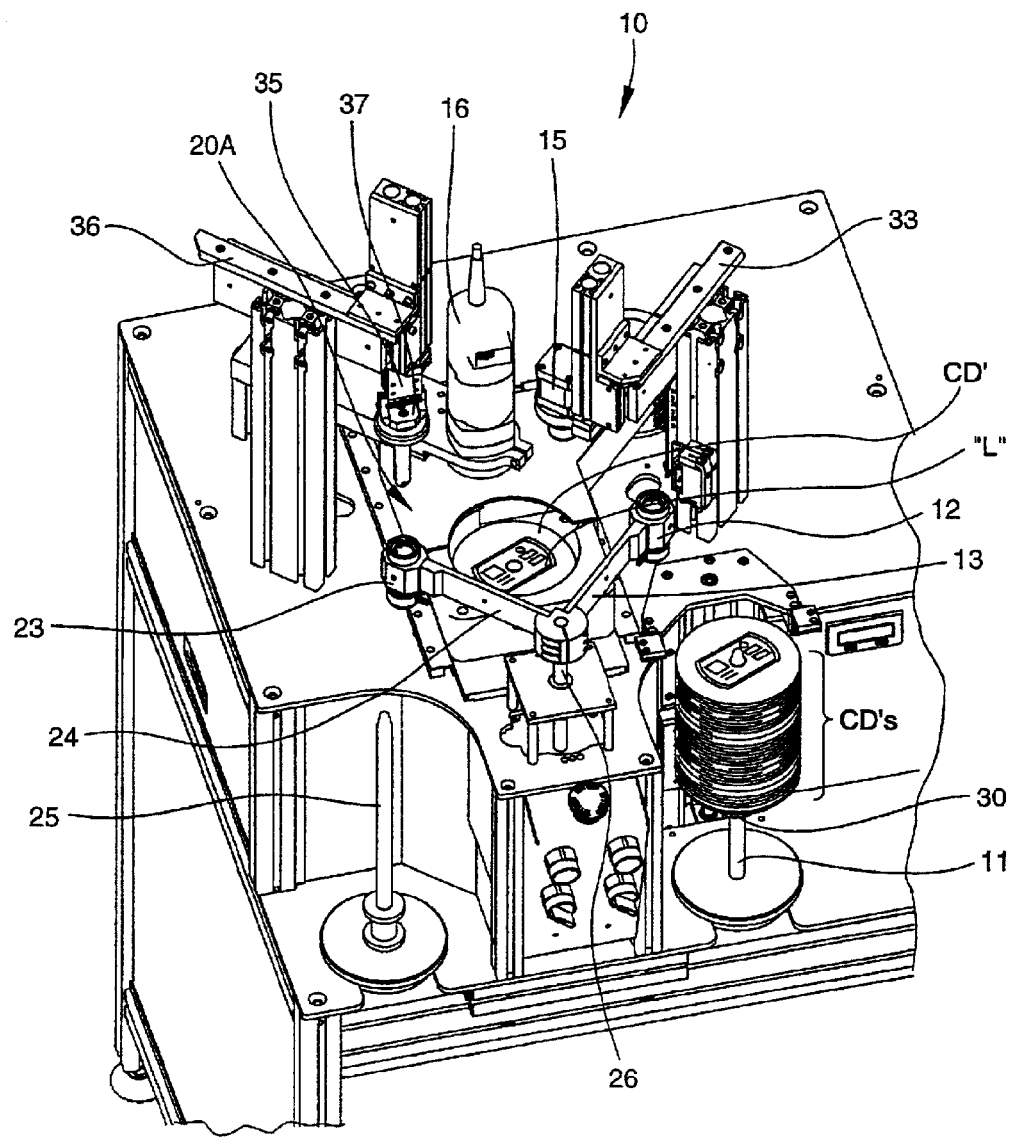
FIG. 7 is a perspective view of the profiler transfer arm moving to a neutral position.

As is shown in FIG. 7, the CD' is in position on the template 40, and the transfer arms 12 and 23 have moved back to the neutral position of FIG. 1. Note that the label "L" of the CD is randomly oriented with regard the template 40. In order for the CD' to be profiled correctly with the label in alignment with the profiled shape, the CD' must be re-oriented in relation to the shape to be cut by the cutter 16.

Figure 7A:
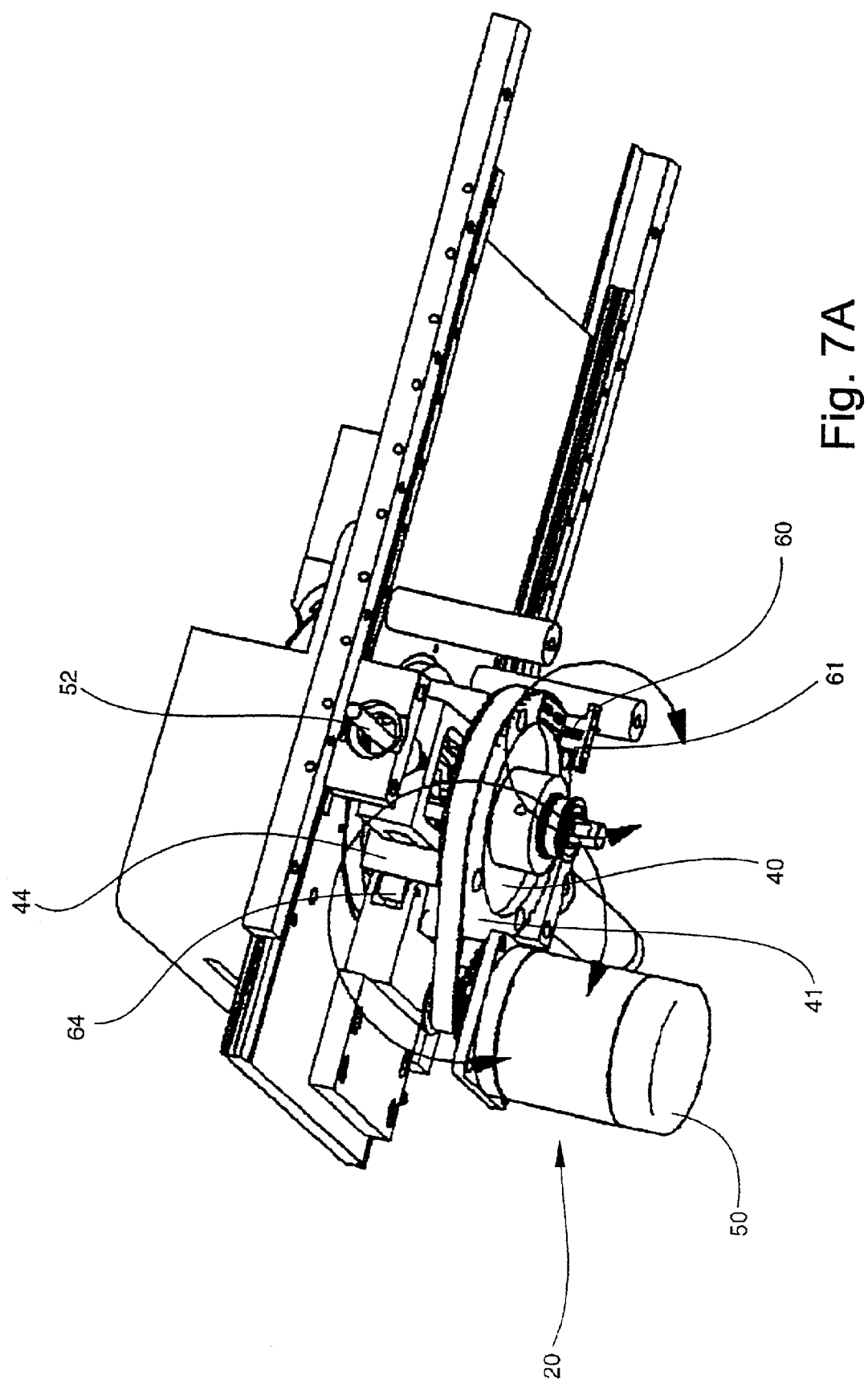
FIG. 7A is a fragmentary view of the undercarriage of the profiler.
Figure 7B:
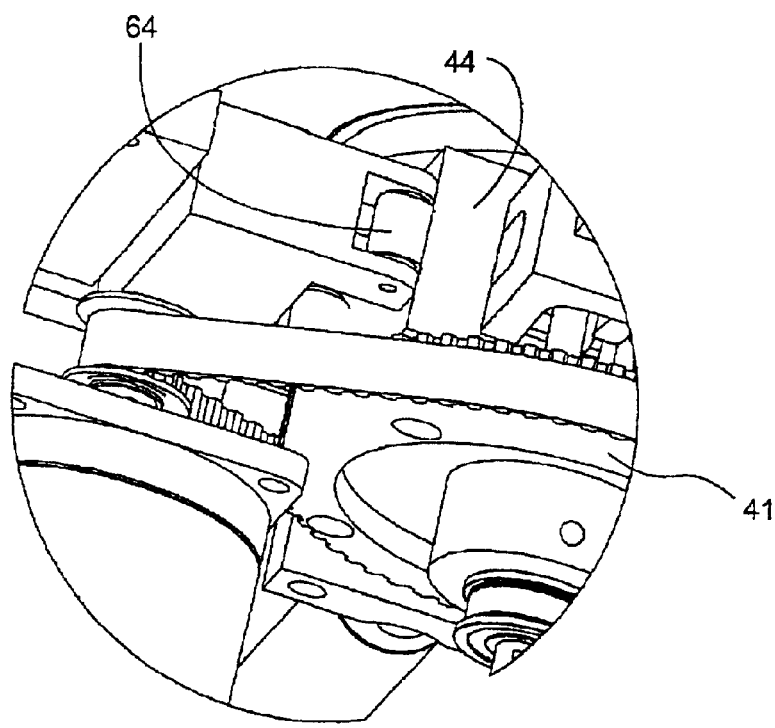
FIG. 7B is an enlarged detail of an area of FIG. 7A.
Figure 7C:
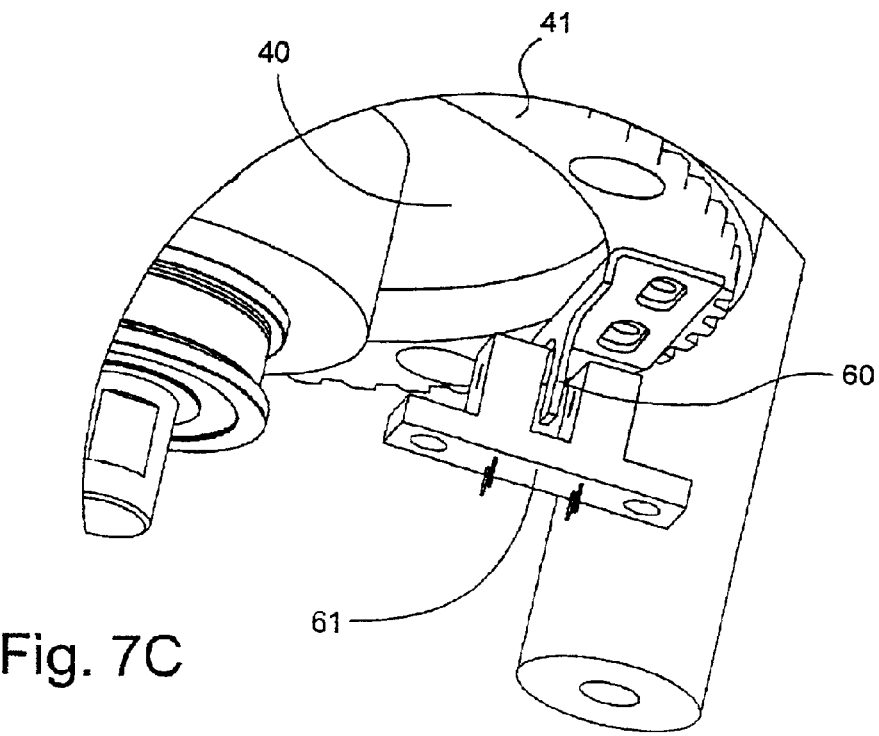
FIG. 7C is an enlarged detail of another area of FIG. 7A.

The template 40 must be located to a known angular range prior to parking the template 40 in the loading position. This insures that the CD' is squared to the proper cutting alignment. This occurs in two steps. FIG. 7A shows the undercarriage 20C of the apparatus 10. The template 40 is rotated by a drive gear 41 driven by the turntable motor 50, also shown in FIG. 1A. As is shown in FIGS. 7A and 7B, the turntable 14 and the template 40 are mounted on a slide table 44, also shown in FIG. 1A. As is shown in FIG. 7C, an optics flag 60 is mounted to the bottom surface of the drive gear 41. Suitable optics 61, for example an infrared or visible light-emitting apparatus well-known in the art is mounted on the undercarriage 20C and generates a light beam that creates a light circuit beneath the drive gear 41. The flag 60 breaks the beam when the turntable is at an approximately correct parking position within a known angular range. This indicates that the turntable 14 is within range of mechanical referencing surfaces. As is shown in FIG. 7B, a stop block 64 carried by the undercarriage 20C positively locates the slide table 44 at the precisely correct profiling position, thus also positively locating the turntable 14 and template 40 at the correct profiling position. This takes place by sliding the template 40 forward on the slide table 44, best shown in FIG. 1A, to an outward position where the cutting will take place.

Figure 8:
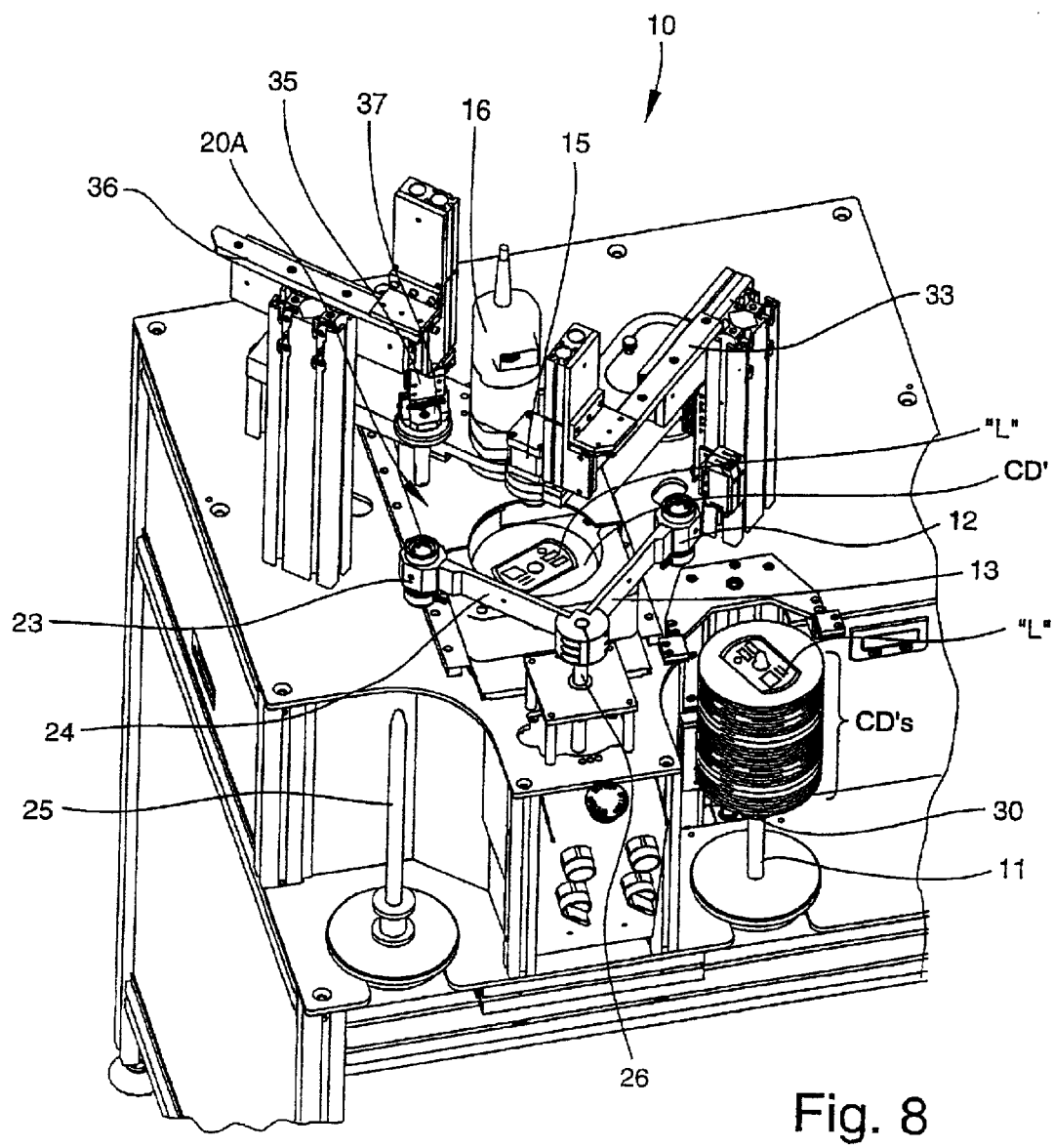
FIG. 8 is a perspective view of the CD orienter arm moving into position.
Figure 9:
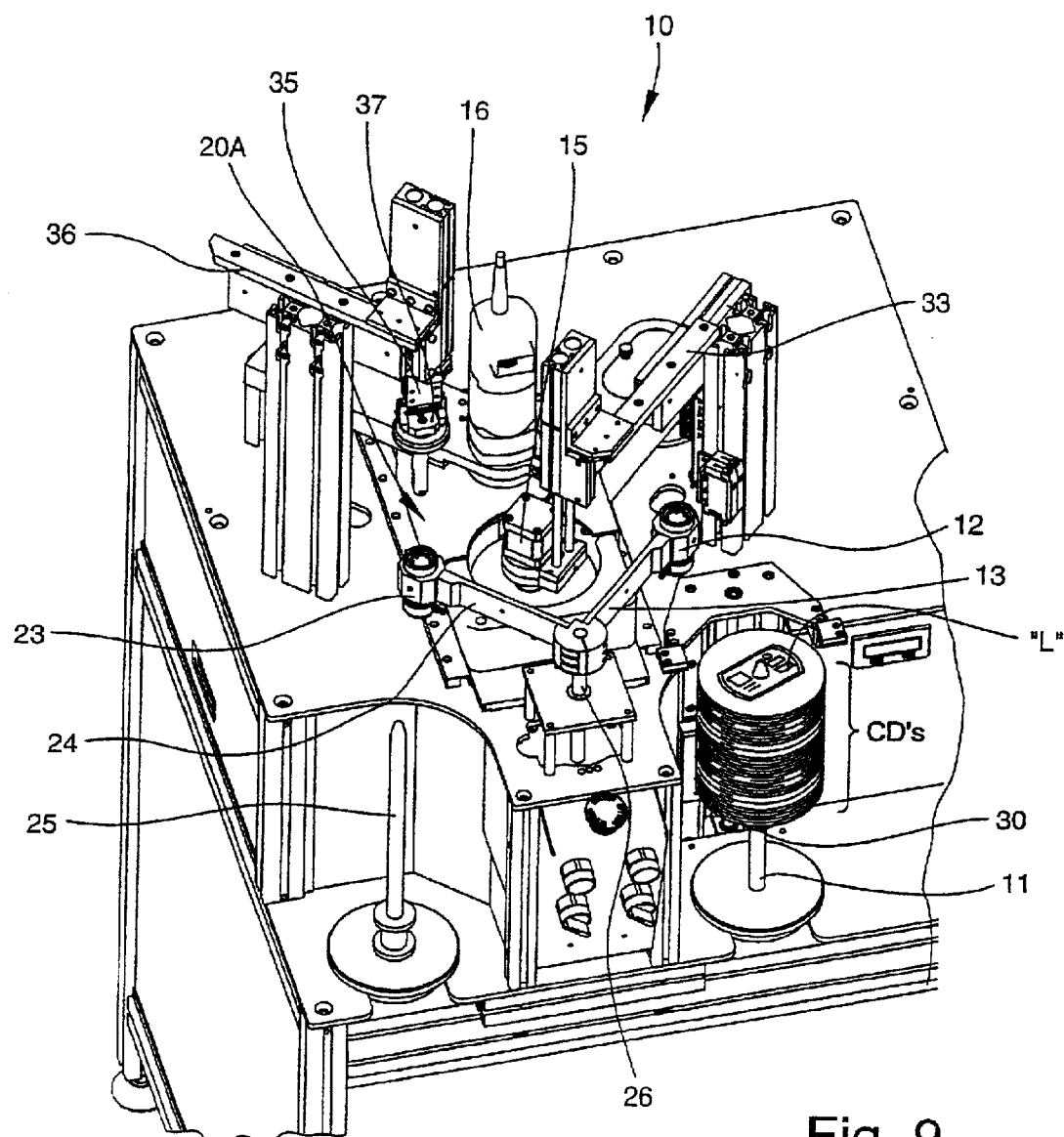
FIG. 9 is a perspective view of the CD orienter arm moving down into contact with the CD on the turntable.
Figure 10:
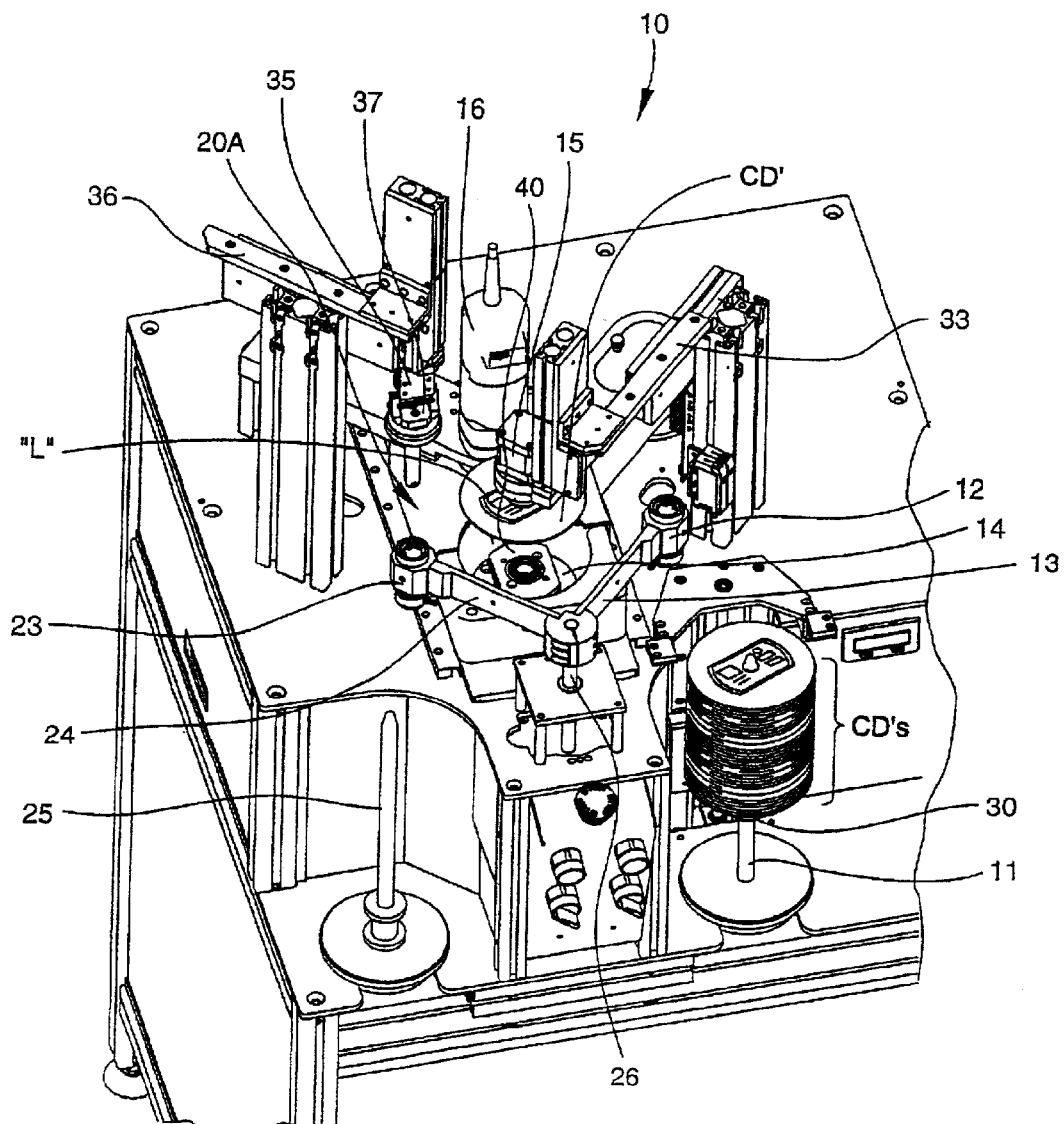
FIG. 10 is a perspective view of the CD orienter arm orienting the CD on the turntable.

As shown in FIG. 8, an orienter arm 33 carrying an orienting vacuum lifter 15 extends radially-inwardly to a position wherein the vacuum lifter 15 is over the CD'. The vacuum lifter 15 moves down onto the CD', as shown in FIG. 9, and picks up the CD', as shown in FIG. 10. The CD' is printed with a reference mark along the edge which is detectable by an optical detector 66 carried on the lifter 15. The reference mark is printed onto an area of the CD' which will be trimmed off and discarded by the profiling process.

Figure 8B:
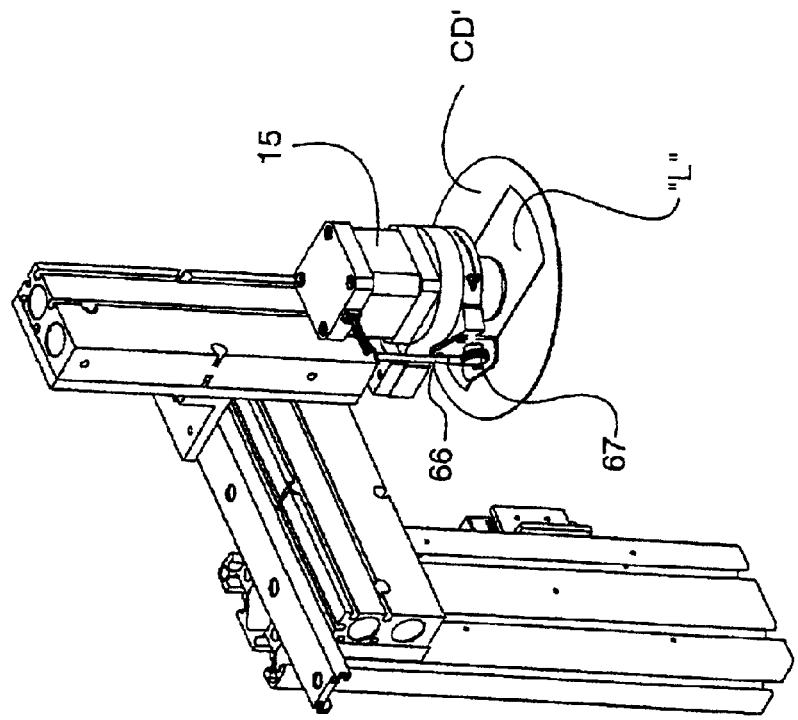
FIGS. 8A and 8B are fragmentary views of the vacuum lifter assembly, showing adjustment of the optical sensor.
Figure 8A:
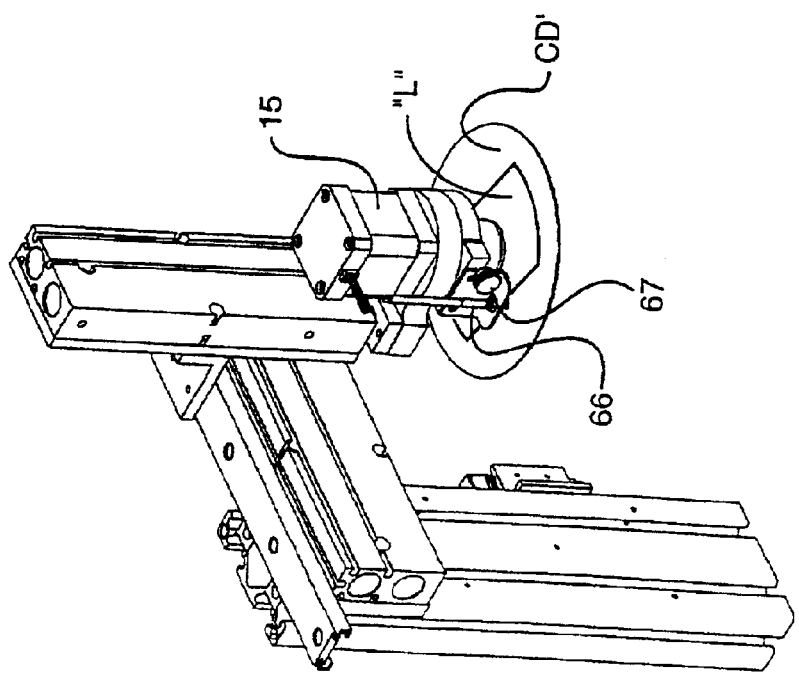
Figure 11:
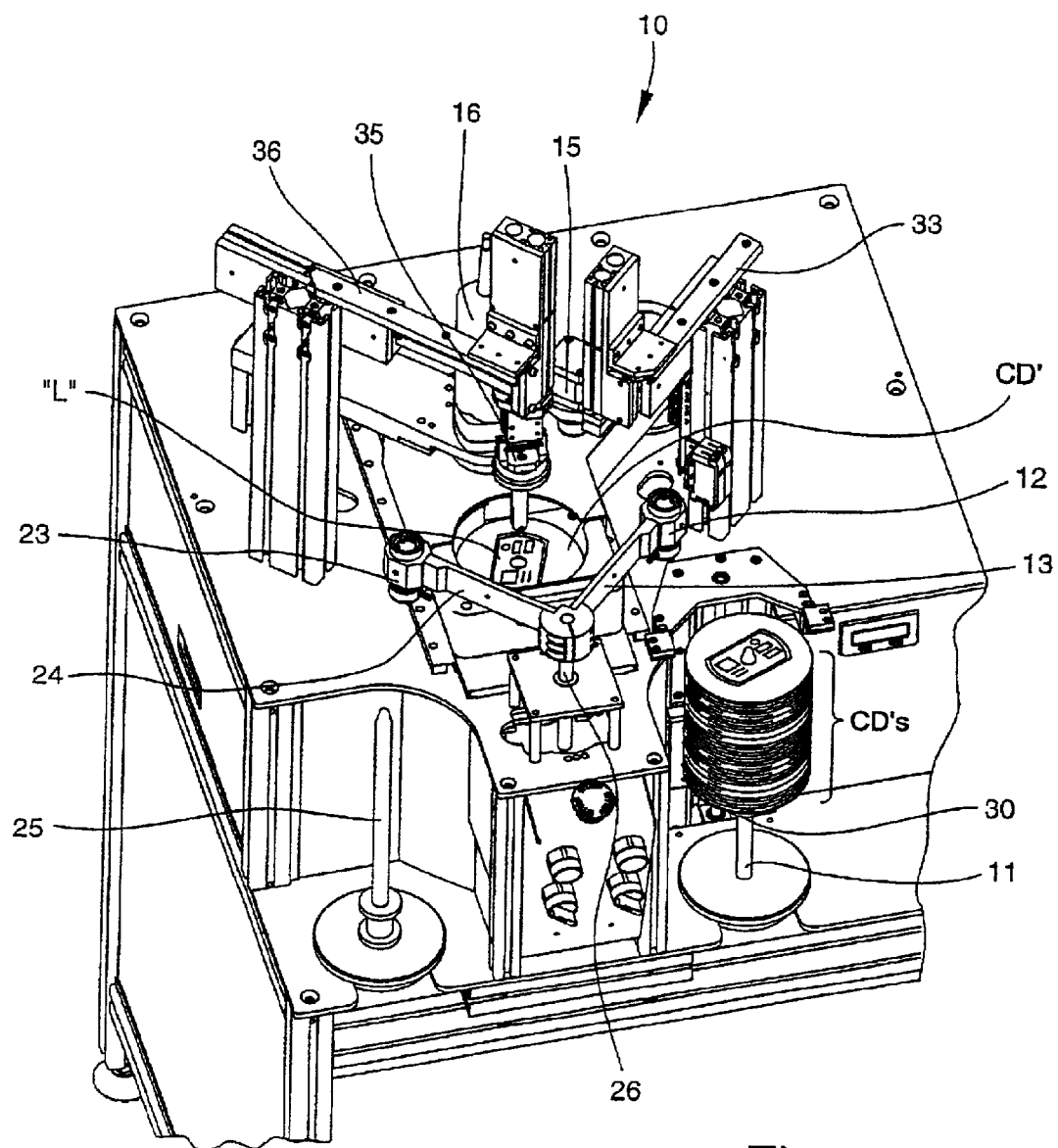
FIG. 11 is a perspective view of the clamp retractor moving into position to clamp the CD onto the turntable.

The vacuum lifter 15 rotates the CD' under the optical sensor 66. When the sensor 66 detects the reference mark, the rotation stops and the CD' is oriented correctly with relation to the template 40, and is in a position where the label "L" is oriented in alignment with the desired shape of the CD' after profiling, as shown in FIGS. 8A, 8B and 11. This position is known as a result of programming the position into a computer which controls operation of the entire apparatus 10. The vacuum lifter then lowers the CD' onto the template 40, releases it and retracts to an at rest position. If a profiling operation reveals that the label "L" is crooked with respect to the profiled CD', a thumb screw 67 is loosened and the position of the sensor 66 is adjusted clockwise or counterclockwise to achieve precise registration of the label "L" with the profiled shape of the CD'.

Figure 12:
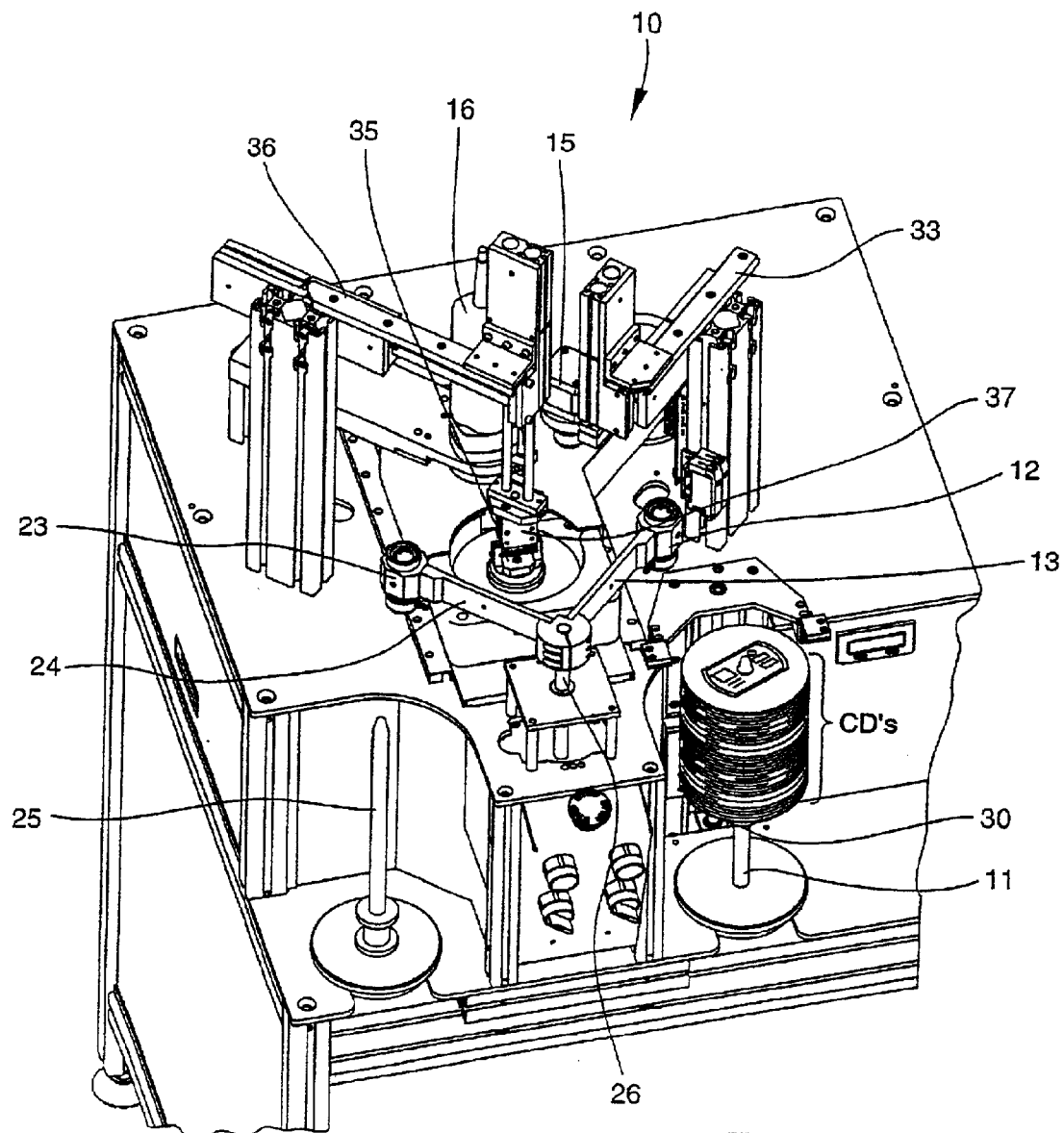
FIG. 12 is a perspective view of the clamp retractor engaging the CD on the turntable.

A clamp retractor 35 is mounted on an arm 36 that extends the clamp retractor 35 from a withdrawn position shown in FIGS. 1–10 to an extended position shown in FIG. 11. The clamp retractor 35 is placed onto the CD' as shown in FIG. 12.

Figure 1A:
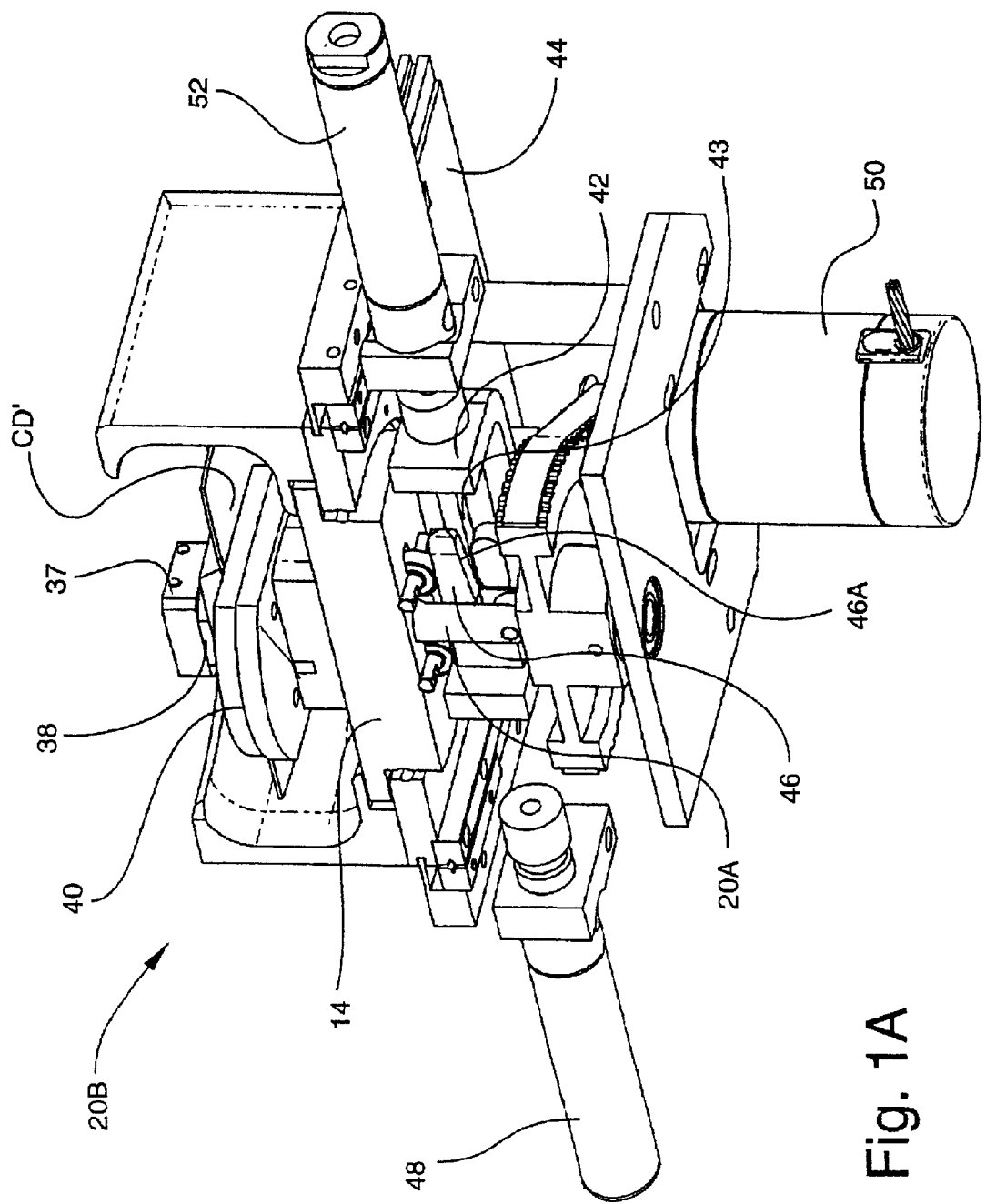
FIG. 1A is a fragmentary, partial cross-sectional, perspective view of the underside of the profiler.
Figure 12A:
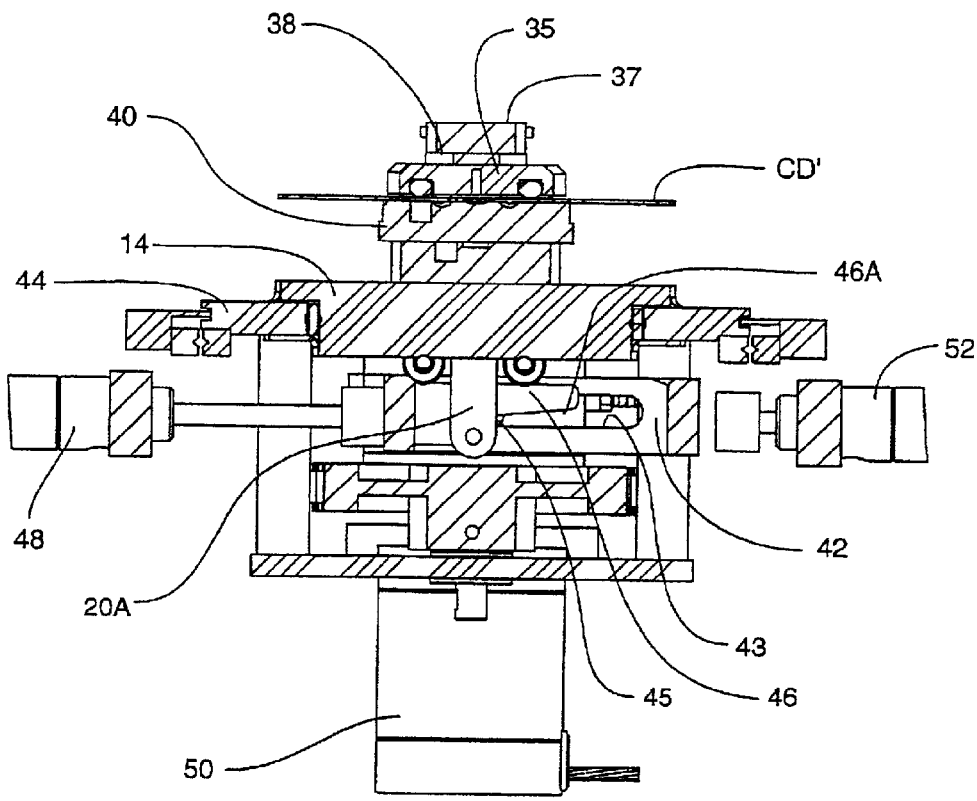
FIG. 12A is a fragmentary side elevation view of the clamp drift pin moving into position to clamp the CD onto the turntable from the bottom.

Referring now to FIGS. 1A and 12A, a more detailed view of the clamping assembly is shown. The clamp retractor 35 carries a clamp cap 37 which resides on an elastomer spring 38 with a downwardly-extending clamp post 20A, is extended through the hole in the center of the CD' and into the drift pin assembly 20B. The clamp cap 37 and the attached clamp post 20A are released by the clamp retractor 35 and reside on top of the CD' during profiling. This feature permits unrestricted access to the CD' before, during and after profiling in a manner which would not be possible were the CD' clamped by a structure positioned below the CD'. The clamp retractor 35 includes a pair of fingers which releases the clamp cap 37 after it has been positioned onto the CD'.

The template 40 has an edge profile in the exact shape of the CD' to be profiled from the round CD' and on which the CD' is positioned, as noted above. The clamp post 20A interconnects the template 40 of the turntable 14 with a drift shuttle 42 having a drift slot 43 therein. The clamp post 20A is split and carries three ball bearings 45 within the split which rides in the drift slot 43. A drift pin 46 with a tapered bottom surface 46A is mounted on the end of a clamping pneumatic cylinder 48. When the clamping cylinder 48 is extended, the drift pin 46 is extended into the drift slot 43 of the drift shuttle 42, causing the clamp post to be urged downwardly onto the top of the CD' positioned on the template 40 of the turntable 14, as is shown in FIG. 12A.

Figure 13:
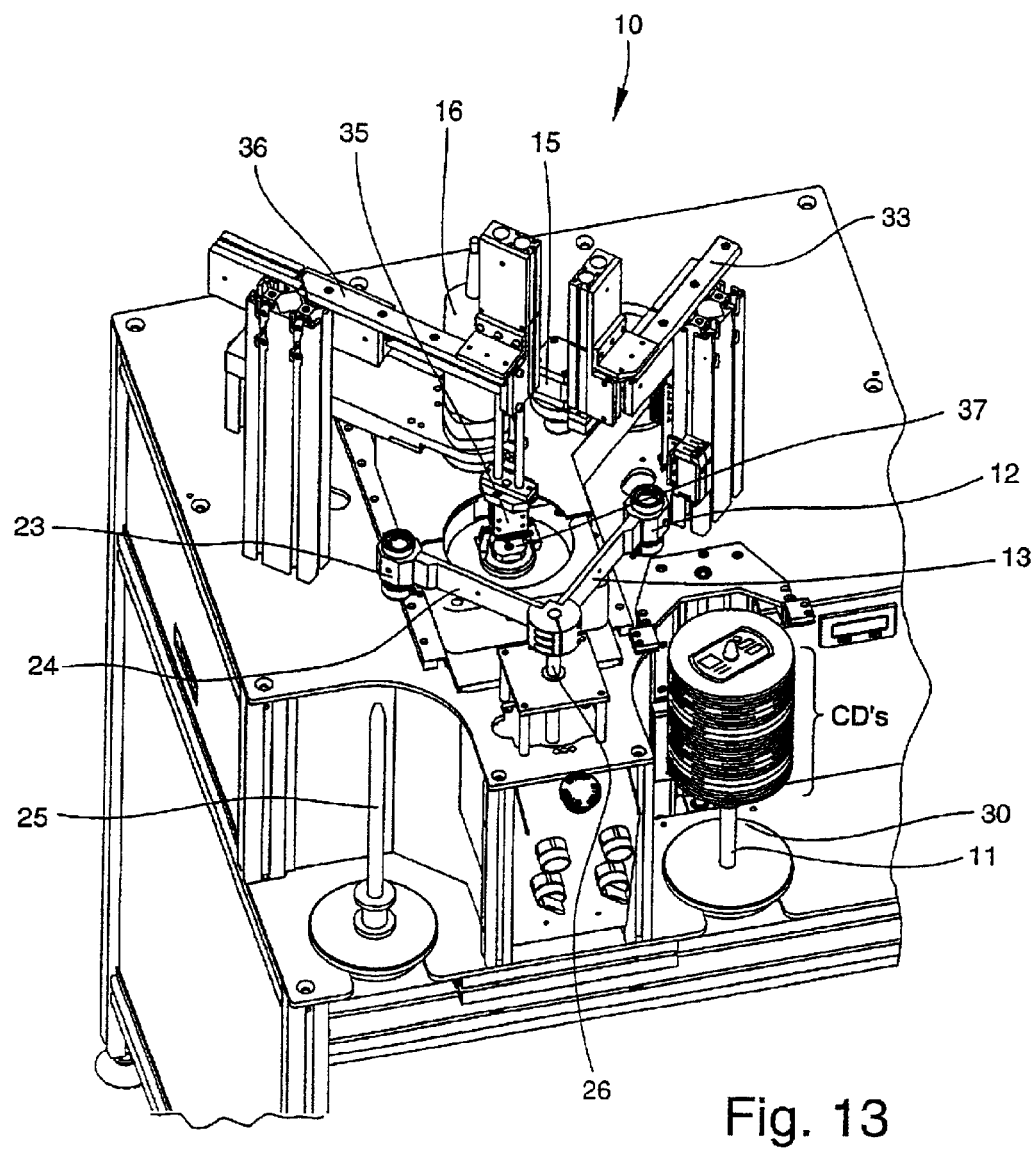
FIG. 13 is a perspective view of the clamp retractor engaging the CD on the top of the CD by downward force by the clamp drift pin and the clamp gripper opening.
Figure 14:
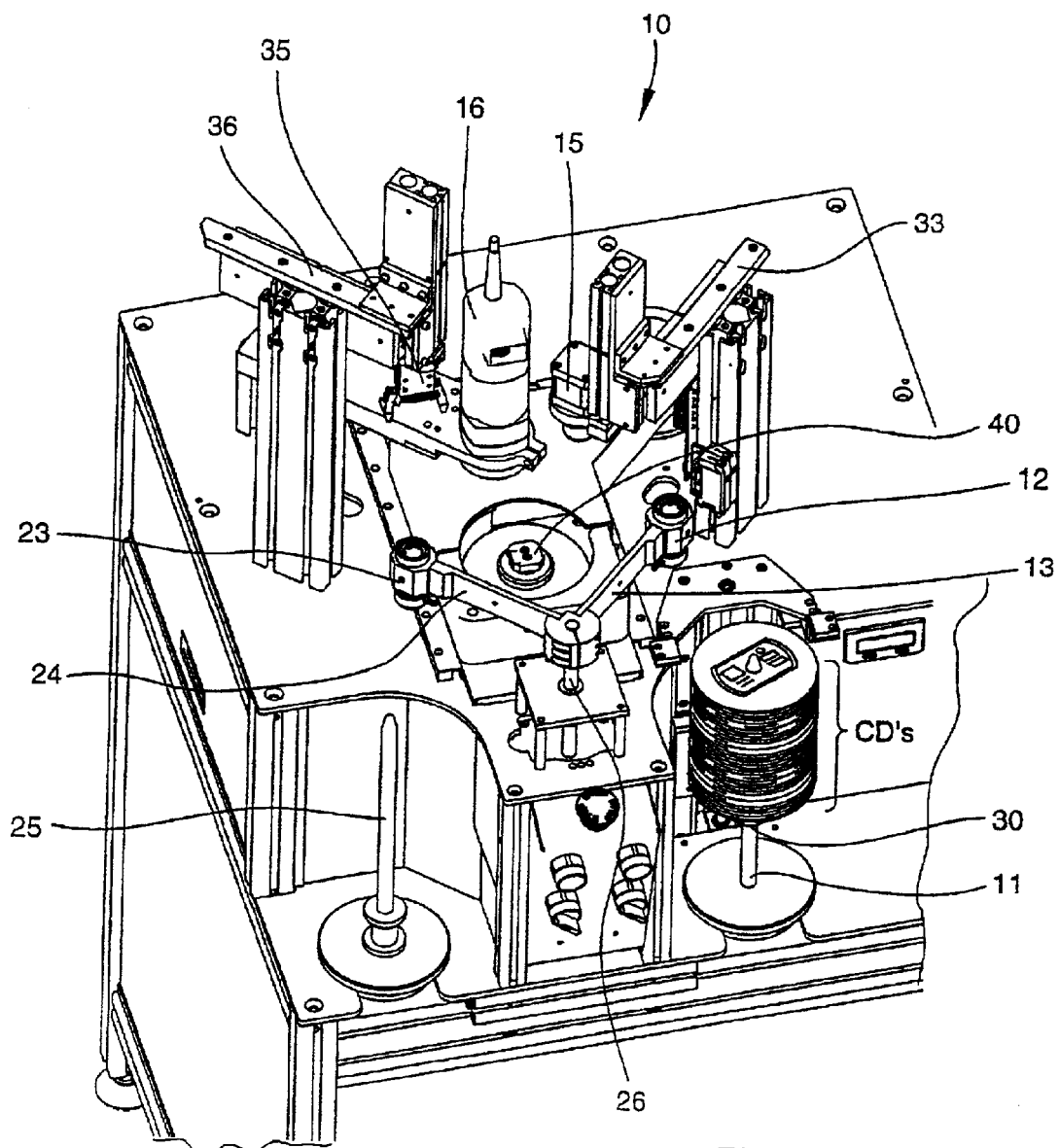
FIG. 14 is a perspective view of the clamp retractor moving to a neutral position.

The clamp retractor opens, leaving the clamp cap 37 and clamp post 20A in clamping position on the template 40 to hold the CD' in a fixed position, as is shown in FIG. 13. The arm 36 moves back to a neutral, withdrawn position, as is shown in FIG. 14.

Figure 15:
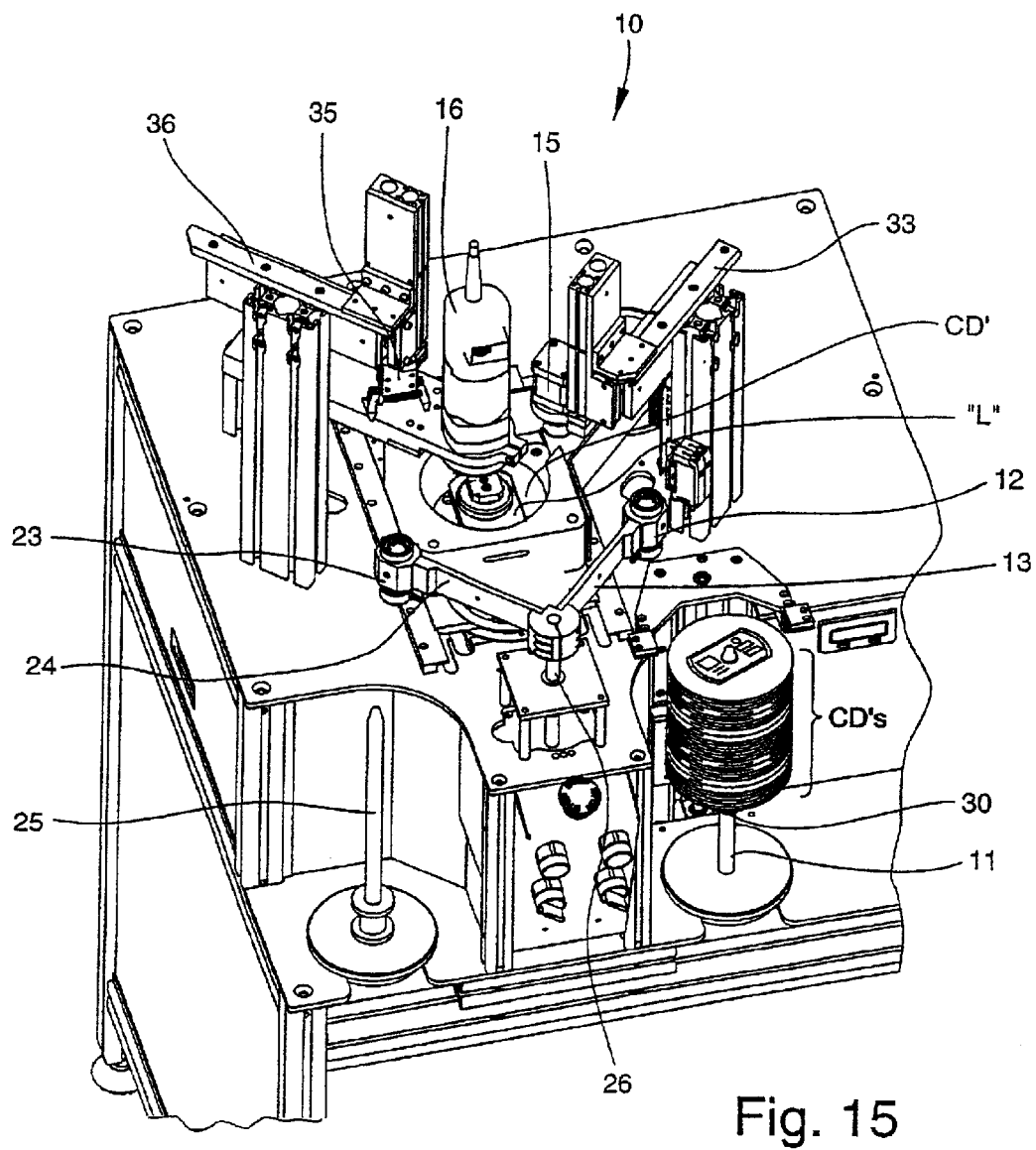
FIG. 15 is a perspective view of the turntable moving the template against the guide pin for a complete rotation, and showing a partially profiled CD.

As is shown in FIG. 15, the cutter 16, which may be, for example, a circuit board router, is moved into cutting position and a guide portion of the cutting bit of the cutter 16 is held against the outer edge of the template 40 as the turntable 14 is rotated one complete rotation by the turntable motor 50, FIGS. 1A, 12A. The CD' is shown in FIG. 15 in a partially profiled shape. The optical sensor 61 senses that the CD' has made one complete revolution and that the profiling operation is complete. Termination of the cutting operation and retraction of the cutter 16 then occurs.

Figure 15A:
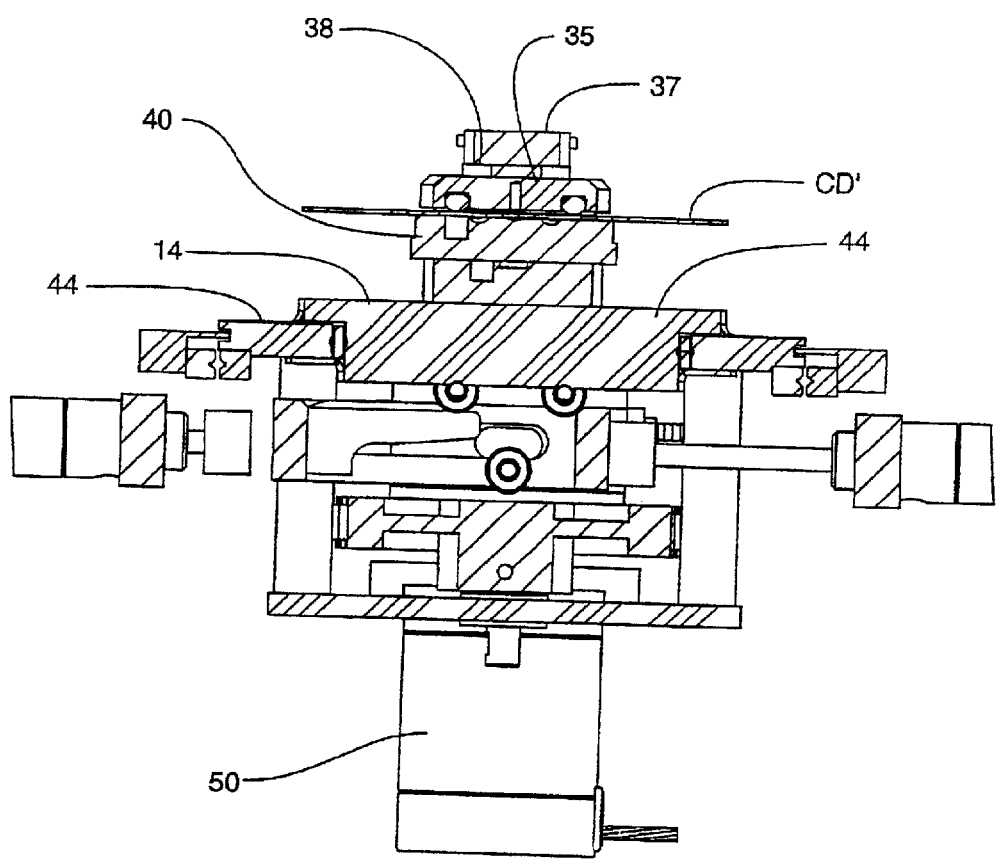
FIG. 15A is a side elevation of the clamp drift pin being moved out of clamping position.

After profiling is complete, as is shown in FIG. 15A, a pneumatic cylinder 52 pushes the drift pin 46 out of the drift slot 43, unclamping the clamp post 20A.

Figure 16:
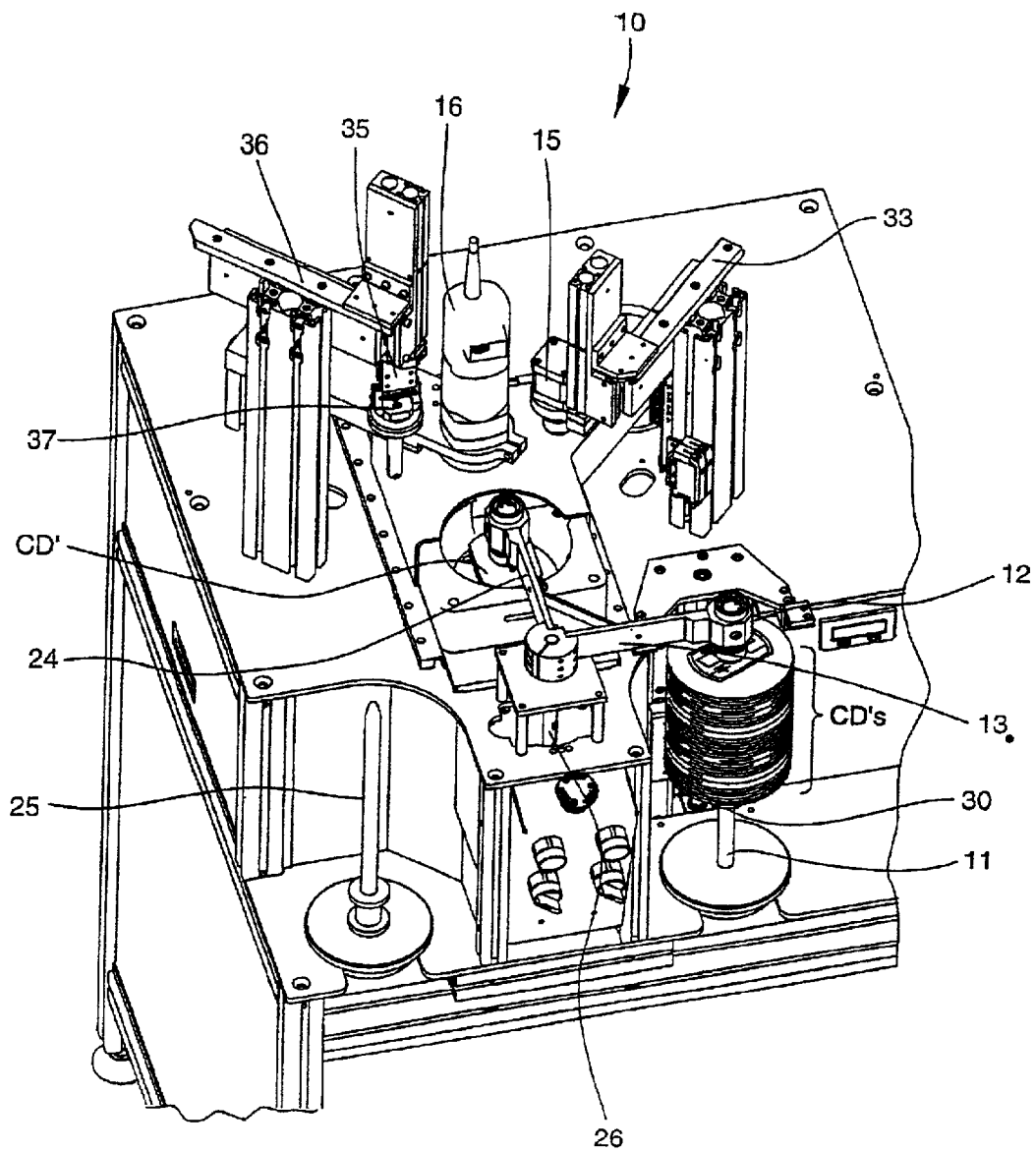
FIG. 16 is a perspective view of the CD having been completely shaped, with the clamp moved to the neutral position, and the transfer arm moved into position to pick up the newly profiled CD from the turntable and a new CD from the supply stack.
Figure 17:
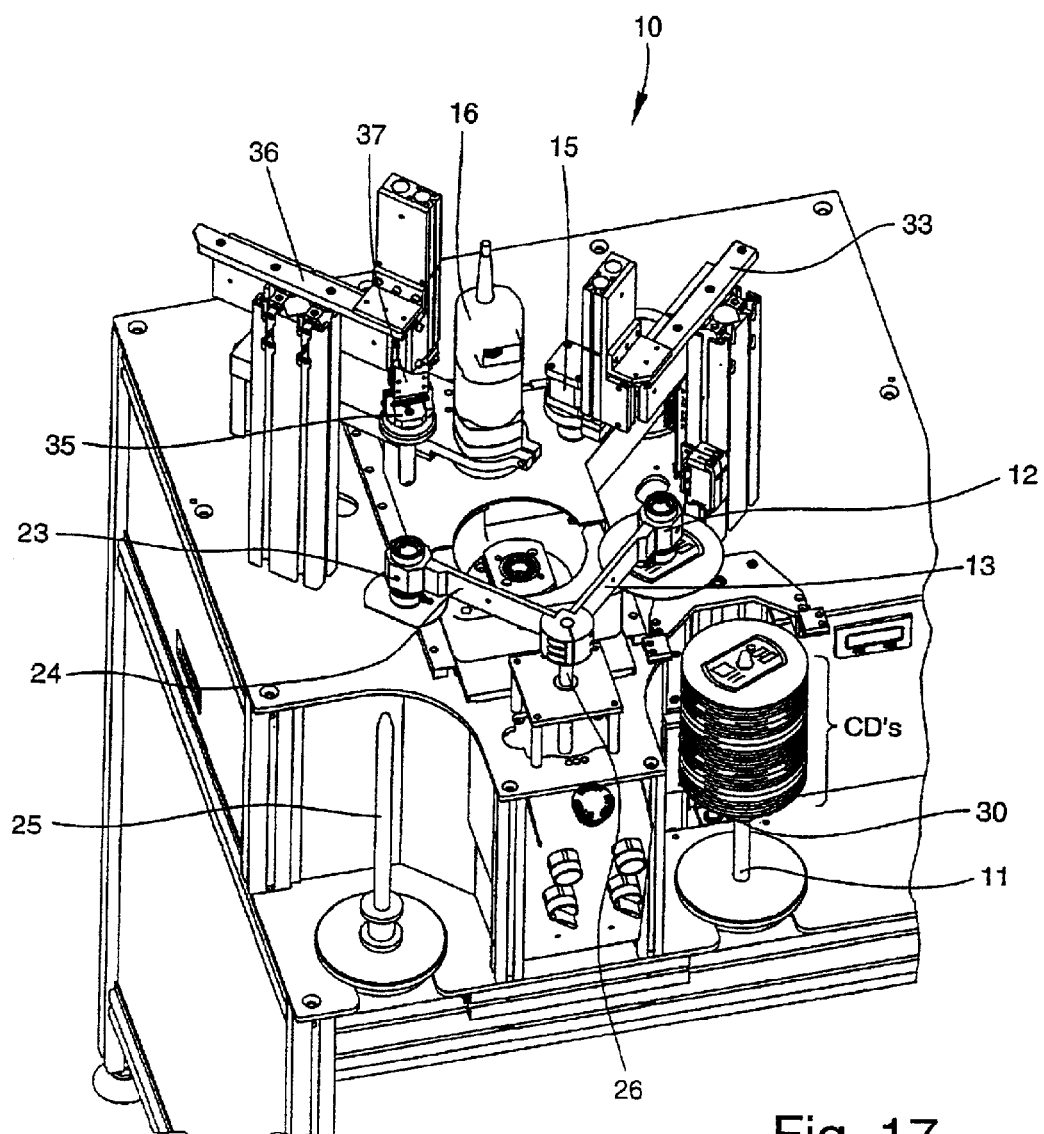
FIG. 17 is a perspective view of the transfer arm moving the profiled CD to a profiled CD storage spindle and the next CD to be profiled to the turntable.

As is shown to in FIG. 16, the clamp cap 37 is removed from the profiled CD' by the clamp retractor 35 and moved into a retracted position. The transfer arms 13 and 24 are rotated clockwise. As is shown in FIG. 17, the vacuum lifter 12 on the end of transfer arm 13 lifts another CD from the supply of CDs on the supply spindle 11, and simultaneously the vacuum lifter 23 on the end of transfer arm 24 lifts the profiled CD' off of the template 40. The transfer arms 13 and 24 are then rotated counterclockwise 90 degrees. The profiled CD' is moved from a position over the template 40 into a position over the storage spindle 25. The next CD to be profiled is moved into position over the template 40, as described above with reference to FIGS. 4–7.

Figure 18:
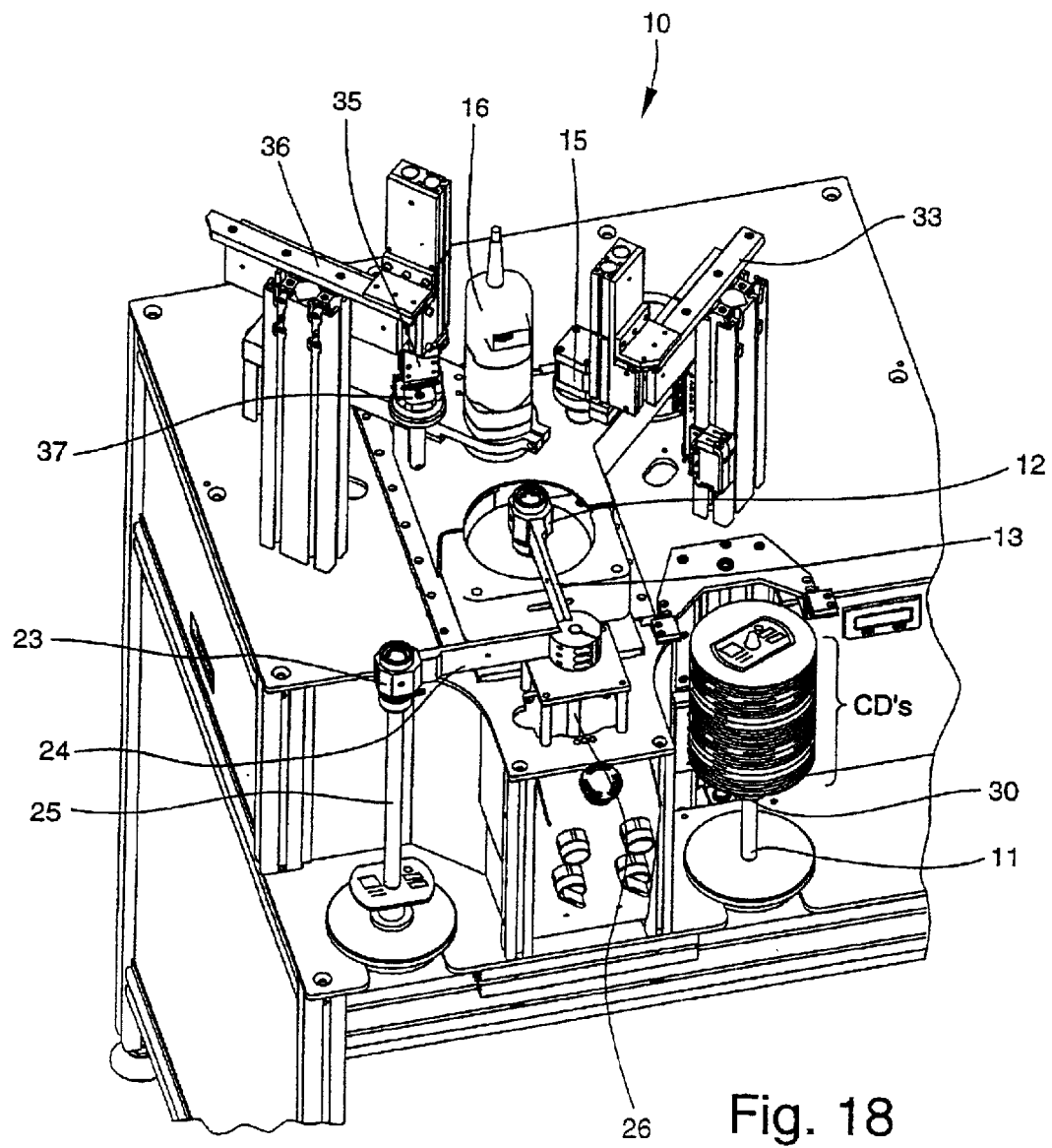
FIG. 18 is a perspective view of the CD to be profiled placed on the turntable and the profiled CD placed on the profiled CD storage spindle.
Figure 19:
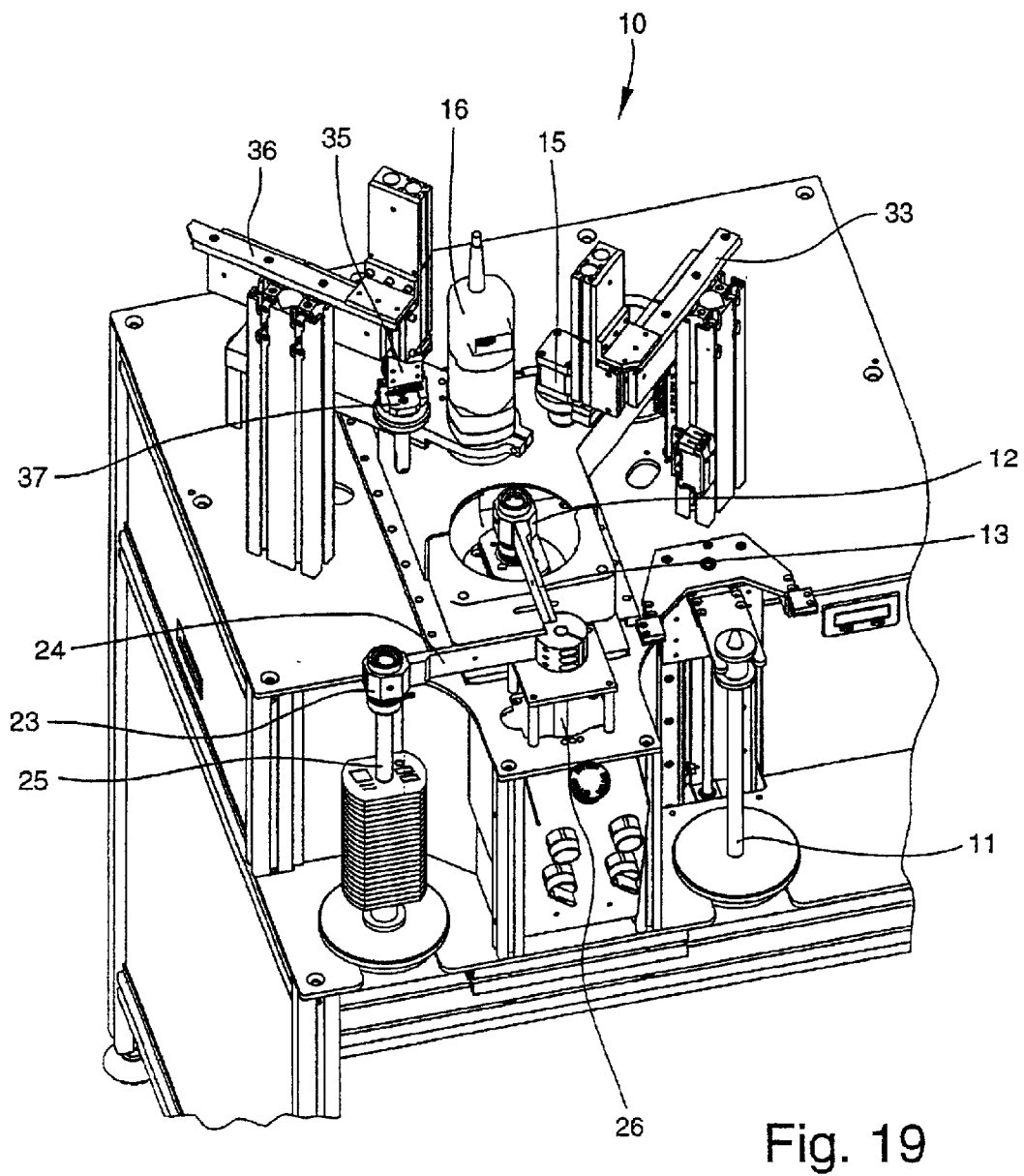
FIG. 19 is a perspective view of FIG. 18 after the CDs have been profiled and placed on the profiled CD storage spindle.

As is shown in FIG. 18, a profiled CD has been positioned on the storage spindle 25 and a new CD to be profiled has been positioned on the template 40. As is shown in FIG. 19, after the number of cycles equaling the number of CDs to be profiled have been performed, all of the CDs have been profiled and placed on the storage spindle 25, whereas the supply spindle 11 is empty, with the base 30 on the supply spindle 11 at its uppermost position.

In practice, the supply of CDs on the supply spindle 11 will be replenished at intervals during the production run, and profiled CDs removed from the storage spindle 25 at intervals as necessary to keep the profiling apparatus 10 operating at maximum efficiency.

The entire system is controlled by a programmed microprocessor in a conventional manner.

An optical disk profiler is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An apparatus for the automated profiling the edge of successive optical disks, and comprising:
   (a) an optical disk supply assembly for holding a supply of optical disks to be profiled;
   (b) a turntable for receiving an optical disk to be profiled, and for reciprocating between an optical disk loading position and an optical disk profiling position;
   (c) a clamping assembly for clamping the optical disk in a stationary condition to the turntable during movement between the loading position and the profiling position;
   (d) a profiling cutter for profiling the edge of the optical disk when the turntable is in the profiling position;
   (e) a profiled optical disk accumulating assembly for holding optical disks which have been profiled; and
   (f) a pickup assembly mounted for rotation on a shaft between a plurality of positions under automated control of an electronic controller for:
      (i) applying a lifting force to an optical disk on the optical disk supply assembly for removing an optical disk from the supply assembly;
      (ii) moving the optical disk to the turntable and interrupting the lifting force to place the optical disk on the turntable;
      (iii) applying a lifting force to the profiled optical disk to remove it from the turntable; and
      (iv) moving the optical disk to the profiled optical disk accumulating assembly for storage.

2. An apparatus for profiling optical disks according to claim 1, wherein the shaft of the pickup assembly is adapted for rotating the optical disk whereby the optical disk is oriented into a predetermined position relative to the profiling cutter preparatory to being placed on the turntable.

3. An apparatus for profiling optical disks according to claim 1, and including a second pickup assembly for rotating the optical disk whereby the optical disk is oriented into a predetermined position relative to the profiling cutter preparatory to being profiled.

4. An apparatus for profiling optical disks according to claim 3, wherein said second pickup assembly comprises a vacuum lifter for applying a vacuum lifting force for holding the optical disk while it is rotated.

5. An apparatus for profiling optical disks according to claim 1, wherein said pickup assembly comprises a vacuum lifter for applying a vacuum lifting force to the optical disk.

6. An apparatus for profiling optical disks according to claim 1, wherein said pickup assembly comprises first and second arms carrying respective first and vacuum pickup heads, said first arm adapted for moving the optical disk from the optical disk supply assembly to the turntable, and said second arm is adapted to move the optical disk to the profiled optical disk accumulating assembly for storage, and said first and second vacuum pickup heads for applying a lifting vacuum force to an optical disk to be lifted.

7. An apparatus for profiling optical disks according to claim 6, wherein said first and second arms are mounted on a common shaft for unison movement relative to each other.

8. An apparatus for profiling optical disks according to claim 7, wherein said first and second arms diverge from said common shaft at a 90 degree angle.

9. An apparatus for profiling optical disks according to claim 1, wherein the clamping assembly for clamping the optical disk in a stationary condition to the turntable during movement between the loading position and the profiling position comprises:
   (a) a clamp for being positioned over the optical disk;
   (b) a spindle carried by the clamp and extending through a hole in the center of the optical disk into the turntable, the spindle including a drift opening therein;
   (c) a drift pin for being moved into the drift opening for applying a clamping pressure on the optical disk and for being moved out of the drift opening for releasing clamping pressure on the optical disk.

10. An apparatus for profiling optical disks according to claim 9, wherein said drift pin includes a tapered surface for riding against a contact surface carried by the spindle and applying a progressive clamping pressure to the optical disk proportional to the degree of taper and the extent of movement of the drift pin relative to the spindle.

11. An apparatus for profiling optical disks according to claim 1, wherein said clamping assembly includes:
   (a) a spindle carried by the clamp and extending through a hole in the center of the optical disk into the turntable, the spindle including a drift opening therein; and
   (b) a drift pin for being moved into the drift opening for applying a clamping pressure on the optical disk and for being moved out of the drift opening for releasing clamping pressure on the optical disk.

12. An apparatus for profiling optical disks according to claim 11, wherein said drift pin includes a tapered surface for riding against a contact surface carried by the spindle and applying a progressive clamping pressure to the optical disk proportional to the degree of taper and the extent of movement of the drift pin relative to the spindle.

13. An apparatus for profiling optical disks according to claim 1, and including a clamp arm for carrying a clamp from a position radially displaced from the optical disk to a position concentric therewith; inserting the clamp into a hole in the turntable concentric with a center hole in the compact disk, and for detaching from the clamp and leaving the clamp in position on the optical disk.

* * * * *